US008328085B1

(12) United States Patent
Shirah et al.

(10) Patent No.: US 8,328,085 B1
(45) Date of Patent: Dec. 11, 2012

(54) BANKING SYSTEM THAT OPERATES TO CAUSE FINANCIAL TRANSFERS RESPONSIVE TO DATA READ FROM DATA BEARING RECORDS

(75) Inventors: Roy Shirah, Norton Canton, OH (US); Andrew Junkins, Round Rock, TX (US); Matthew Force, Uniontown, OH (US); Mike Ryan, Canton, OH (US); William D. Beskitt, Canton, OH (US); Robert Bowser, North Canton, OH (US); Mark D. Smith, North Canton, OH (US)

(73) Assignee: Diebold, Incorporated, North Canton, OH (US)

( * ) Notice: Subject to any disclaimer, the term of this patent is extended or adjusted under 35 U.S.C. 154(b) by 190 days.

(21) Appl. No.: 12/803,512

(22) Filed: Jun. 28, 2010

Related U.S. Application Data

(62) Division of application No. 12/798,094, filed on Mar. 30, 2010, now abandoned, which is a division of application No. 09/993,062, filed on Nov. 13, 2001, now abandoned.

(60) Provisional application No. 60/248,382, filed on Nov. 14, 2000.

(51) Int. Cl.
*G07F 19/00* (2006.01)
*G06Q 40/00* (2006.01)

(52) U.S. Cl. .......................................... 235/379; 705/43

(58) Field of Classification Search .................. 235/379; 705/43

See application file for complete search history.

(56) References Cited

U.S. PATENT DOCUMENTS

| | | | |
|---|---|---|---|
| 2,306,894 | A | 12/1942 | Nelson |
| 4,569,526 | A | 2/1986 | Hamilton |
| 5,020,760 | A | 6/1991 | Mayr |
| 5,398,161 | A | 3/1995 | Roy |
| 5,652,421 | A | 7/1997 | Veeneman et al. |
| 5,703,795 | A | 12/1997 | Mankovitz |
| 5,725,321 | A | 3/1998 | Brannan et al. |
| 5,785,190 | A | 7/1998 | Otema |
| 5,794,547 | A | 8/1998 | Dallman et al. |
| 5,804,804 | A | 9/1998 | Fukatsu et al. |
| 5,812,668 | A | 9/1998 | Weber |
| 5,832,463 | A | 11/1998 | Funk |
| 5,905,781 | A | 5/1999 | McHale et al. |
| 6,006,534 | A | 12/1999 | Correa |
| 6,230,971 | B1 | 5/2001 | Matsumoto et al. |
| 6,332,571 | B1 | 12/2001 | Arima et al. |
| 6,422,940 | B1 | 7/2002 | Walker et al. |

(Continued)

OTHER PUBLICATIONS

Blackie Kellie. ATMs: More than Meets the Eye. Dec. 1998. NPN, National Petroleum News. ABI/Inform Global. 90, 13. pp. 26-32.

(Continued)

*Primary Examiner* — Jamara Franklin

(74) *Attorney, Agent, or Firm* — Ralph E. Jocke; Daniel D. Wasil; Walker & Jocke

(57) ABSTRACT

A banking system includes a plurality of automated banking machines and operates to cause financial transfers responsive to data read from data bearing records. Each machine (10) includes a user interface (16), a card reader (18) of data bearing records, a cash dispenser (42), and other transaction function devices. The card reader operates to read card data corresponding to financial accounts from user cards. In exchange for providing the machines at no charge to a merchant, user transaction fees assessed to machine users are shared by both the machine provider and the merchant.

30 Claims, 13 Drawing Sheets

U.S. PATENT DOCUMENTS

| | | | | |
|---|---|---|---|---|
| 6,648,220 | B1 * | 11/2003 | Junkins et al. | 235/379 |
| 6,871,192 | B2 * | 3/2005 | Fontana et al. | 705/51 |
| 6,945,457 | B1 | 9/2005 | Barcelou | |
| 6,991,156 | B1 | 1/2006 | Somers, Jr. | |
| 8,214,290 | B1 * | 7/2012 | Vannatter et al. | 705/43 |
| 2002/0032656 | A1 | 3/2002 | Chen | |
| 2006/0064391 | A1 * | 3/2006 | Petrov et al. | 705/65 |

OTHER PUBLICATIONS

Banker's Research. YourNet Widens Application of Smart Cards. Westport. Feb. 1997. p. 12.

Paul Demery (Aug. 1997). How CSS is Changing the ATM Business. Credit Card Management, 10(5), 58. Retrieved Sep. 10, 2007, from ABI/Inform Global Database. (Document ID: 13598194).

PR Newswire. Heartland Paynneni. Systems and Cybersource Debut One-Stop E-Commerce Payment Solution. New York. May 4, 1999. p. 1.

PR Newswire. National Association of College Stores Announces ATM Franchise Partnership with Diebold. New York. Sep. 14, 2000. p. 1.

* cited by examiner

BANKING SYSTEM THAT OPERATES TO CAUSE FINANCIAL TRANSFERS RESPONSIVE TO DATA READ FROM DATA BEARING RECORDS

CROSS REFERENCE TO RELATED APPLICATIONS

This application is a divisional of application Ser. No. 12/798,094 filed Mar. 30, 2010 now abandoned, which is a divisional of application Ser. No. 09/993,062 filed Nov. 13, 2001 now abandoned, which claims benefit pursuant to 35 U.S.C. §119(e) of Provisional Application 60/248,382 filed Nov. 14, 2000.

TECHNICAL FIELD

This invention relates to banking systems that operate to cause financial transfers responsive to data read from data bearing records which may be classified in U.S. Class 235, Subclass 379.

BACKGROUND ART

Automated banking machines are known in the prior art. A common type of automated banking machine is an automated teller machine are used by consumers to carry out transactions. Such transactions may include cash withdrawals, deposits, account transfers, bill payments, check cashing, issuing scrip, issuing money orders and other types of financial transactions. Automated banking machines may be configured to carry out various types of transactions depending upon the needs of the operator and the transaction function devices that are included within the machine. For purposes of this disclosure an automated banking machine shall be considered to include ATMs and any other machines that carry out electronic transactions including transfers of value.

Automated banking machines have traditionally been operated by banks. Automated banking machines enable banking customers to carry out transactions conveniently without the intervention of a human teller. In recent years automated banking machines have been installed in other types of business establishments. For example automated banking machines are becoming more common in hotels, sports venues, restaurants, service stations and grocery stores. The ability of operators to impose transaction fees has increased the number of automated banking machines. This is because the entities who install such machines are provided with a financial incentive which will often outweigh the cost of acquiring the machine and its operation.

While automated banking machines are more prevalent now than in the past, there is still a substantial cost associated with installing and operating a machine. This is because automated banking machines typically cost several thousand dollars. In addition a person wishing to install an automated banking machine must provide a communications link to a financial transaction processing network which processes the messages that allow the machine to carry out transactions. Further the operator of the machine must often contract with a network switch operator that can route transaction messages to and from the various other networks which communicate with banks and other entities and which can process debit and/or credit transactions.

Further costs associated with operating an automated banking machine often include purchasing a service contract. A service contract is required so that if the machine malfunctions, it is placed back in service promptly. Further, in many situations store owners and others who operate their own ATMs retain a cash handling service to securely replenish the cash within the machine. Such services may also serve to replenish consumable items such as receipt paper, printer cartridges and other items that need periodic replacement.

The costs associated with obtaining and operating an automated banking machine limit the number of establishments that can provide this convenience to their customers.

OBJECTS OF EXEMPLARY EMBODIMENTS

It is an object of an exemplary embodiment of the invention to provide an automated banking machine.

It is a further object of an exemplary embodiment of the present invention to provide an automated banking machine that is economical to manufacture.

It is a further object of an exemplary embodiment of the present invention to provide an automated banking machine that is economical to obtain and install.

It is a further object of an exemplary embodiment of the present invention to provide an automated banking machine that is economical to operate.

It is a further object of an exemplary embodiment of the present invention to provide an automated banking machine that requires reduced labor to install.

It is a further object of an exemplary embodiment of the present invention to provide an automated banking machine that may be relatively readily serviced.

It is a further object of an exemplary embodiment of the present invention to provide an automated banking machine that can often be replaced rather than repaired at the operating site.

It is a further object of an exemplary embodiment of the present invention to provide an automated banking machine that may be provided at little or no cost to the operator.

It is a further object of an exemplary embodiment of the present invention to provide an automated banking machine in which cash and consumable items may be readily replenished.

It is a further object of an exemplary embodiment of the present invention to provide an automated banking machine that is readily operated by a consumer.

It is a further object of an exemplary embodiment of the present invention to provide an automated banking machine that is readily securely mounted in a facility.

It is a further object of an exemplary embodiment of the present invention to provide an automated banking machine that may be mounted in numerous configurations.

It is a further object of an exemplary embodiment of the present invention to provide a system which may be used by consumers to carry out transactions.

It is a further object of an exemplary embodiment of the present invention to provide a system in which a merchant may participate and receive revenue from transaction fees paid on transactions carried out at an automated banking machine.

It is a further object of an exemplary embodiment of the present invention to provide a method of deploying an automated banking machine.

It is a further object of an exemplary embodiment of the present invention to provide a method by which a user may obtain an automated banking machine for their business or other type establishment at little or no cost.

It is a further object of an exemplary embodiment of the present invention to provide a method in which a merchant may participate in receiving income from transaction fees carried out at an automated banking machine.

Further objects of exemplary embodiments of the present invention will be made apparent in the following Detailed Description of Exemplary Embodiments.

The foregoing objects are accomplished in an exemplary embodiment by an automated banking machine and a method of deploying and operating such automated banking machines. The exemplary automated banking machine includes a compact housing which may be mounted either on or in an interior wall of a facility. Alternatively the housing may be mounted on a pedestal, all of which mounting approaches are generally secure and relatively low in cost.

The exemplary automated banking machine includes a cash dispenser. The dispenser is operative to dispense currency bills or notes. The cash dispenser may be readily accessed by authorized persons and replenished as needed. The automated banking machine further includes a printing device which may be used for printing receipts or other documents for a user. The exemplary automated banking machine further includes input and output devices for receiving identifying inputs from a user and for communicating therewith. In the exemplary embodiment the input devices include a card reader and a keypad. The output devices include a display. Of course these input and output devices are exemplary and in other embodiments other or additional devices may be used. In an exemplary embodiment the input and output devices provide a convenient user interface for providing outputs and receiving inputs, and for delivering cash and receipts.

In the exemplary embodiment the automated banking machine is configured at the point of manufacture or pre-installation preparation to communicate with a single transaction processing provider. This is accomplished by having the machine configured to communicate with one or more system addresses associated with the particular provider. The exemplary machine does not include any device therein to allow the configured system address(es) to be changed. The exemplary automated banking machine is further configured with information which provides the transaction processing provider with information which identifies the machine and/or other data related to the machine operation. In the exemplary embodiment identifying information is correlated through stored data or in another manner with pertinent data related to the machine such as the owner, the location, the owner's bank account information and other data. The pre-configuration of the exemplary automated banking machine reduces the need to provide configuration type programming at the time of installation.

In an exemplary embodiment the automated banking machine is provided to merchant and other users who meet certain criteria at little or no cost. In the exemplary embodiment a merchant wishing to obtain such a machine for example, may apply to receive one. This is done in an exemplary embodiment by presenting the application online such as through the Internet. If the user qualifies, the data concerning the user is stored in the ATM provider's system and the machine is configured by the provider for use at the merchant's location.

In an exemplary embodiment the ATM provider provides for the delivery and installation of the automated banking machine at the merchant's location. The ATM provider also makes the necessary arrangements for communication links and electrical power. The ATM provider also instructs the merchant on the operation, loading and replenishing of the machine.

In an exemplary embodiment the ATM provider or an associated entity, receives the transaction messages from the automated banking machines that have been deployed. The ATM provider switches the transaction messages to the various ATM networks, banks and/or other entities so as to authorize appropriate cash withdrawals from the machine. The ATM provider uses the stored data concerning the merchant and their bank account to credit the merchant for the amount of cash dispensed from the machine to consumers who receive cash from the machine. In addition the ATM provider assesses transaction fees to consumers and pays the merchant a percentage thereof. This may be done by crediting their account. In an exemplary embodiment the ATM provider also reports to the merchant concerning the operation of the machine and other financial information.

In an exemplary embodiment the merchant operator is enabled to perform routine functions on the machine. These include replenishing the machine with cash owned by the merchant, replacing consumable items such as paper, and repairing minor malfunctions such as paper jams. In the event of a major malfunction the ATM provider may readily configure another machine with the merchant's information and replace the currently installed machine with another machine. This reduces the time spent making repairs in the field and may be accomplished by persons who do not need to have in-depth technical knowledge of the operation of the machine.

DETAILED DESCRIPTION OF EXEMPLARY EMBODIMENTS

Figure 1:
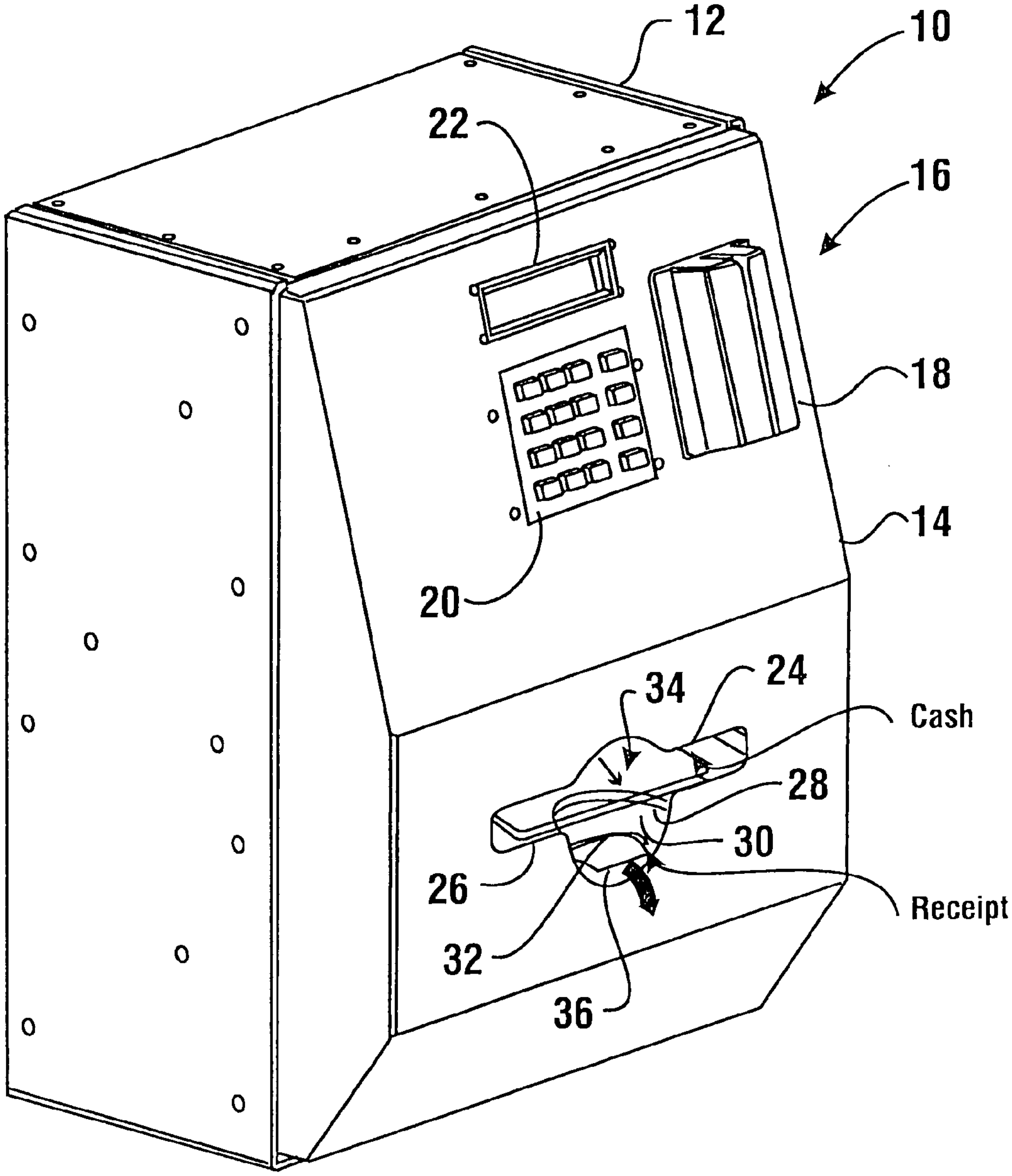
FIG. 1 is an isometric front view of an automated banking machine of an exemplary embodiment.

Referring now to the drawings and particularly FIG. 1 there is shown therein an exemplary embodiment of an automated banking machine generally indicated 10. Machine 10 includes a housing 12. Housing 12 includes a cover or fascia 14. Fascia 14 is generally locked in the position shown in FIG. 1 when the machine is in operation. However in the exemplary embodiment the fascia is movable when unlocked by authorized persons in a manner later described, to enable such authorized persons to gain access to the interior of housing 12.

Machine 10 includes a user interface 16. User interface 16 includes input and output devices. In the exemplary embodiment the input devices include a card reader 18 and a keypad 20. Keypad 18 is used for reading magnetic stripe type cards such as debit cards. The information that is read from such cards is usable as later discussed, to identify a user and/or their account. Of course in other embodiments other types of card readers or input devices may be used.

Keypad 20 in the exemplary embodiment includes alphanumeric keys similar to those on a touch-tone phone. Keypad 20 further includes function keys. The function keys may be labeled with appropriate commands such as "yes", "no", "enter", and "cancel." Of course such function keys are exemplary and in other embodiments other arrangements and input devices may be used.

In the exemplary embodiment a display 22 is provided. Display 22 serves as an output device for providing instructions and information to a user. Such instructions may include for example information on how to operate the machine to accomplish transactions. In addition display 22 may also provide other types of information including advertising and promotional information, account balance information or other types of outputs. In the exemplary embodiment display 22 is a multiple line LCD type display. Of course this output device is exemplary and in other embodiments of the invention other types of displays and/or output devices may be used.

In the exemplary embodiment fascia 14 includes therein an opening which comprises a delivery pocket 24. In the exemplary embodiment delivery pocket 24 includes an elongated opening and an enlarged central area. Delivery pocket 24 has extending therein a shelf surface 26 extending generally transverse to the outer face of the fascia and generally horizontal. The shelf surface includes a central cutout 28. In the exemplary embodiment the delivery pocket further includes a rounded wall 30 bounding the delivery pocket below the shelf surface. The rounded wall 30 includes a receipt delivery slot 32. In operation of the exemplary embodiment, currency bills 34 are delivered in a manner later explained to the delivery pocket. The currency bills are delivered so as to be supported on the shelf surface until taken by a user. Receipts as represented by a receipt 36, are delivered through the receipt delivery slot 32. A useful aspect of the exemplary embodiment is that a user is enabled to take dispensed bills and their receipt together by grasping them single handedly in the area of the cut out or by taking such items individually from the delivery pocket 24. Of course these structures are exemplary and in other embodiments other structures and arrangements may be used.

In the exemplary embodiment the housing 12 is sized to be relatively compact. The exemplary form of the housing is approximately 14 inches in width between the side walls of the housing. This configuration enables the housing to be fit in adjacent close fitting relation between wall studs having a 16-inch on-center spacing. This facilitates mounting the machine in various ways which are later described.

Figure 2:
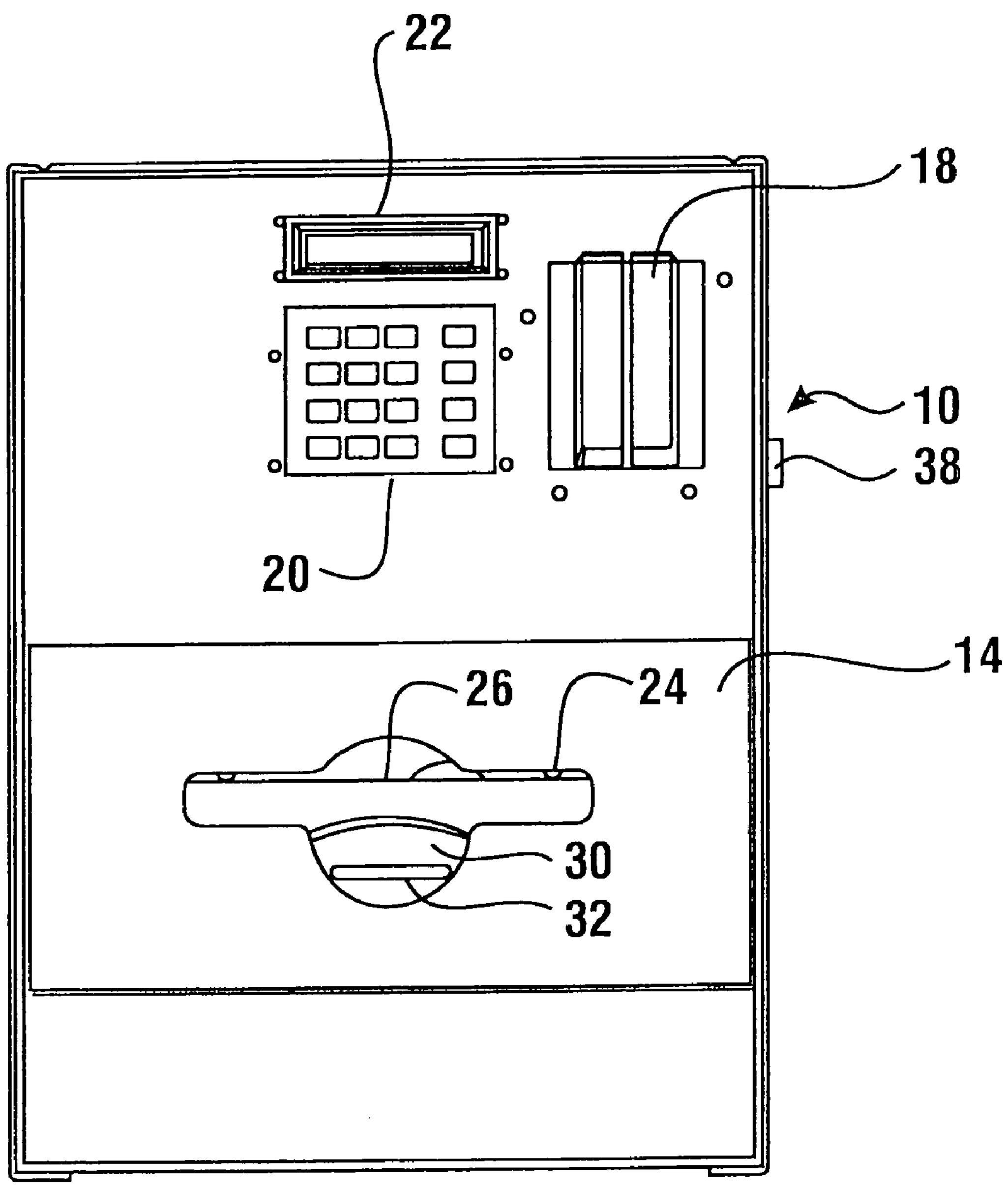
FIG. 2 is a front plan view of the automated banking machine shown in FIG. 1.

As shown in FIG. 2 the exemplary form of the automated banking machine 10 includes a lock indicated 38 for releasably holding the fascia 14 in a locked position. In some exemplary embodiments of the invention, lock 18 may be a key lock. The key may be retained by the operator of the facility in which the machine is installed or other authorized person(s) who is to have access to the interior area of the machine. For purposes of brevity such individuals will be referred to hereafter as a merchant. The merchant may use the key in some embodiments where lock 38 is a key lock, to gain access to the interior of housing 12. In other exemplary embodiments, the lock may be an electronic lock. In such exemplary embodiments the merchant uses a code to unlock the lock. This is done in an exemplary embodiment by a merchant user holding down a predetermined one or more of the function or other keys, and inputting a combination through the alphanumeric keys while holding down the other designated key(s). If the proper combination is input, the lock 38 will enable the fascia to be opened. Of course these approaches are exemplary and in other embodiments other types of locks and securing mechanisms may be used.

Figure 3:
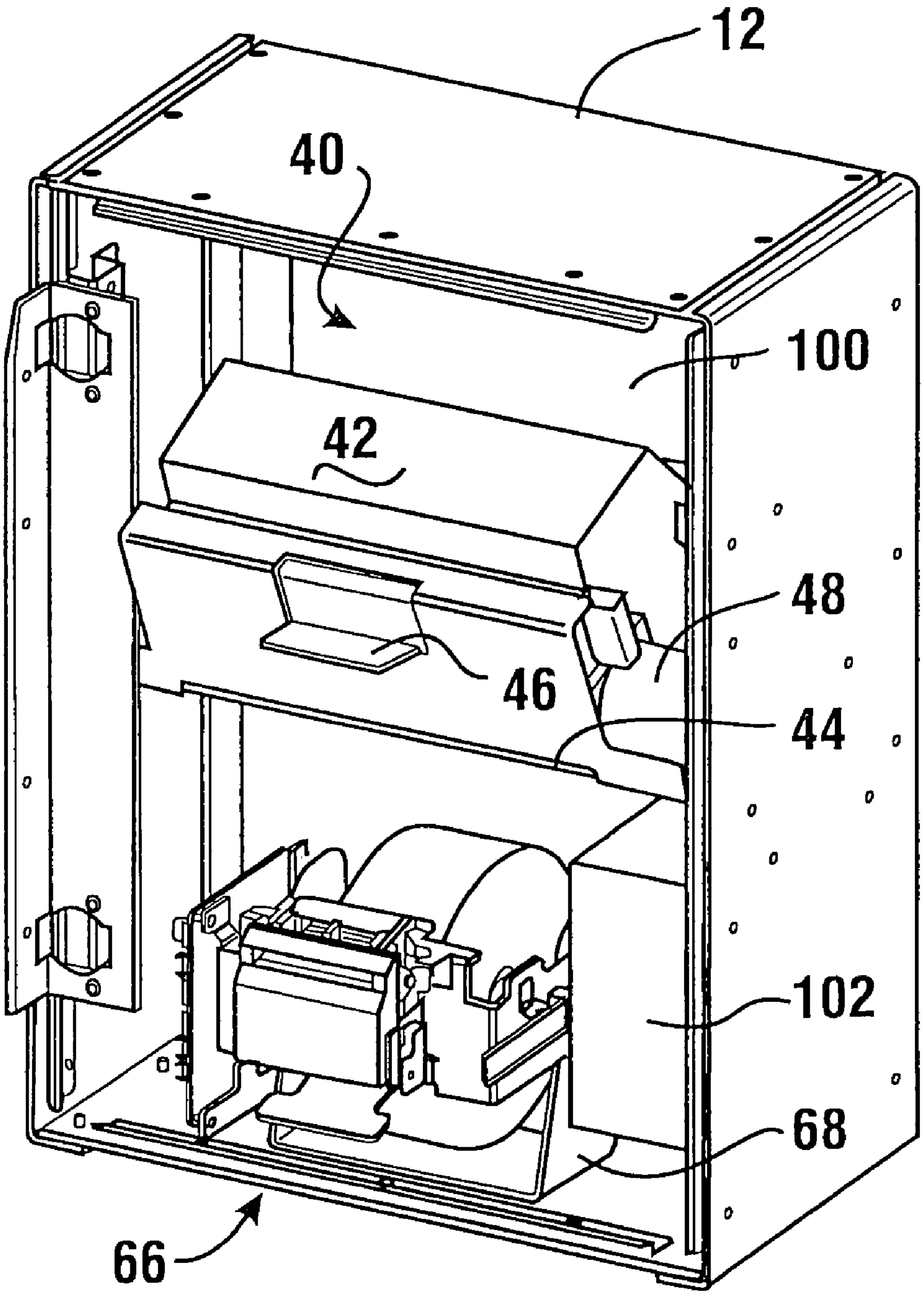
FIG. 3 is an isometric view of the automated banking machine shown in FIG. 1 with the fascia removed.

In the exemplary form of the automated banking machine shown, the fascia 14 is mounted in a hinged fashion so that it may be swung open when the lock 38 is placed in an unlocked condition. With the fascia 14 in an open condition such as is shown in FIG. 3, an authorized person is enabled to access devices in an interior area 40 of the housing. In the exemplary embodiment the interior area 40 includes a bill dispenser 42. The bill dispenser 42 selectively delivers bills out of the machine one at a time in response to electrical signals. The bills are delivered through a bill delivery slot 44. Delivery slot 44 is configured so that when the fascia 14 is in a closed position, bills that pass through the slot 44 are delivered onto the top of the shelf surface 26 such that the dispensed cash is accessible from outside the housing. Bill dispenser 42 further includes a handle 46, the purpose of which is later discussed in detail. Bill dispenser 42 further has in operative connection therewith a motor 48 or other appropriate drive mechanism which provides the necessary movement of components for delivering bills from the storage location in the note dispenser through the delivery slot 44.

Figure 4:
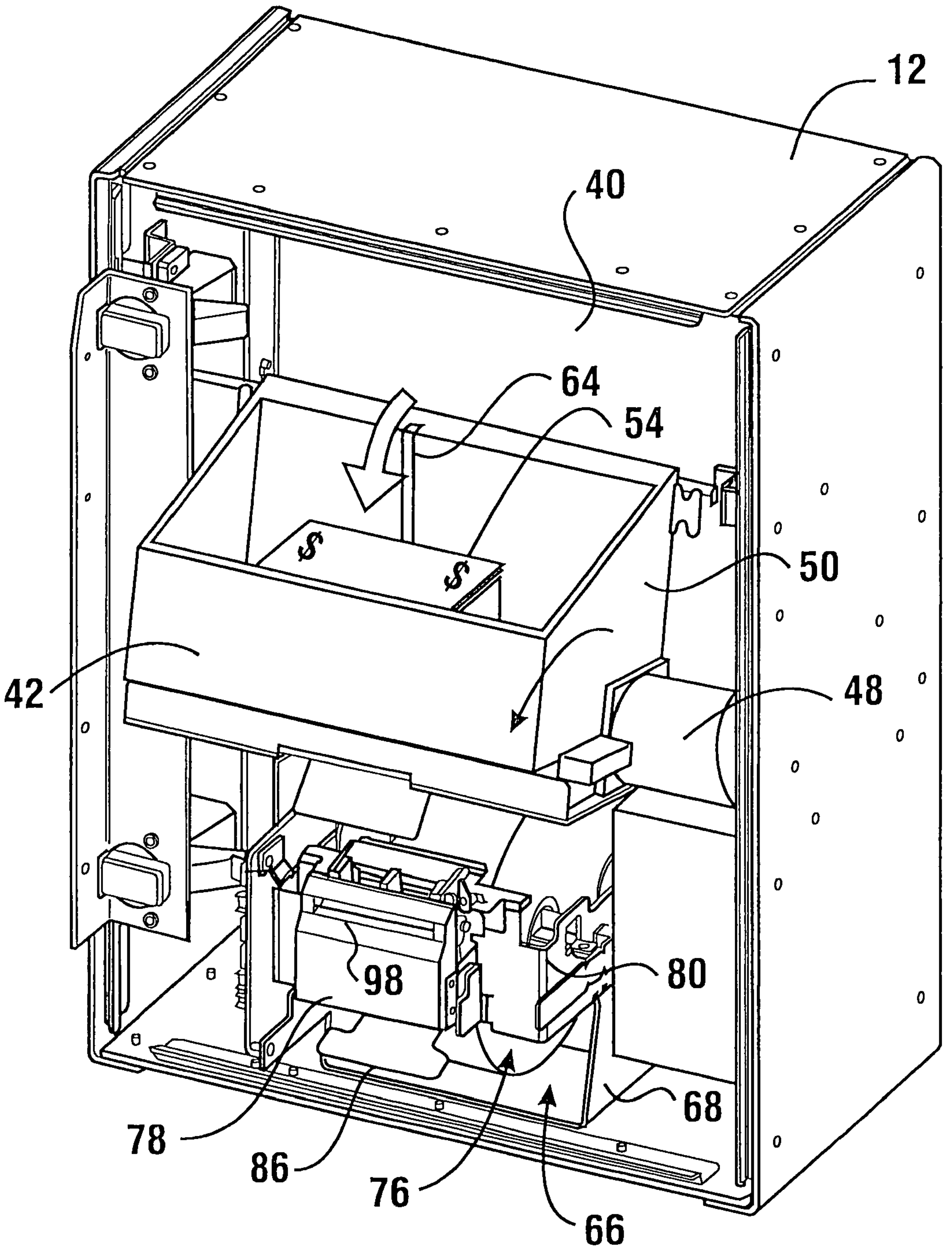
FIG. 4 is a view similar to FIG. 3 with the cash dispenser in a position for currency loading.
Figure 5:
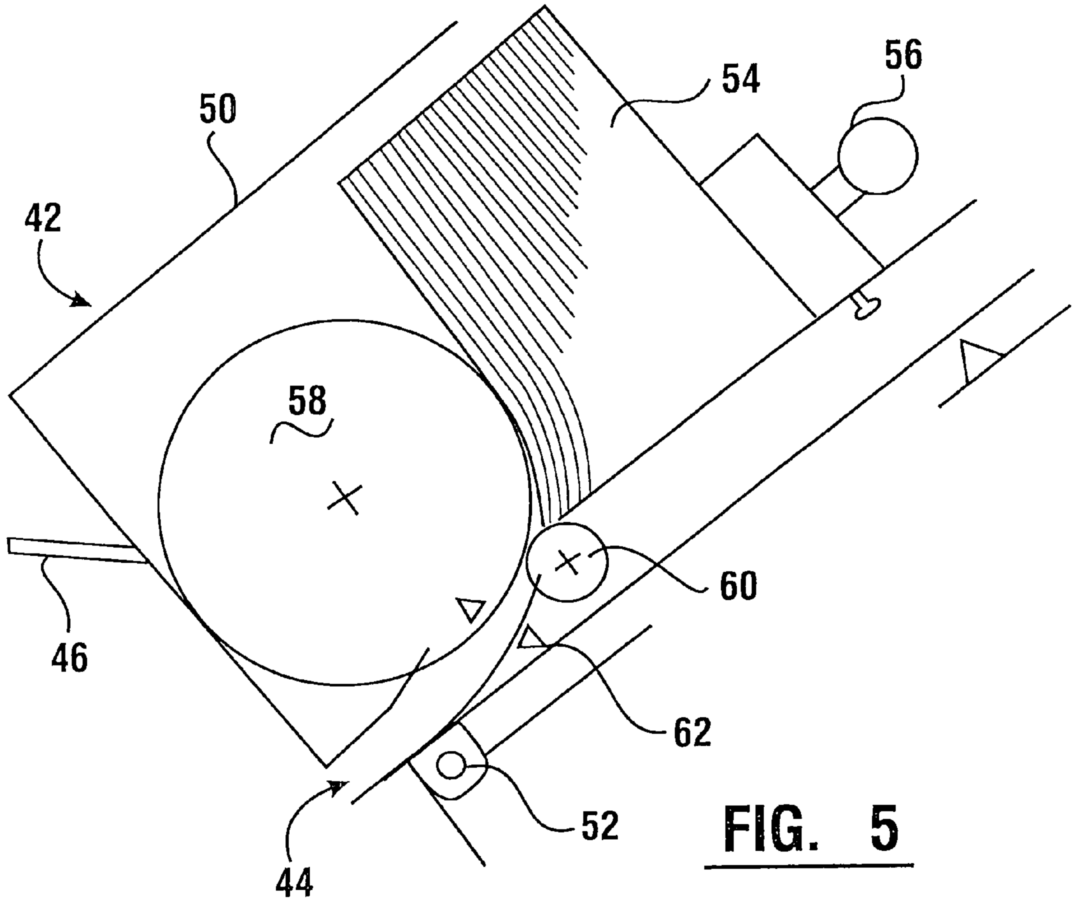
FIG. 5 is a schematic side view of the currency dispenser in an operative position in the machine.
Figure 6:
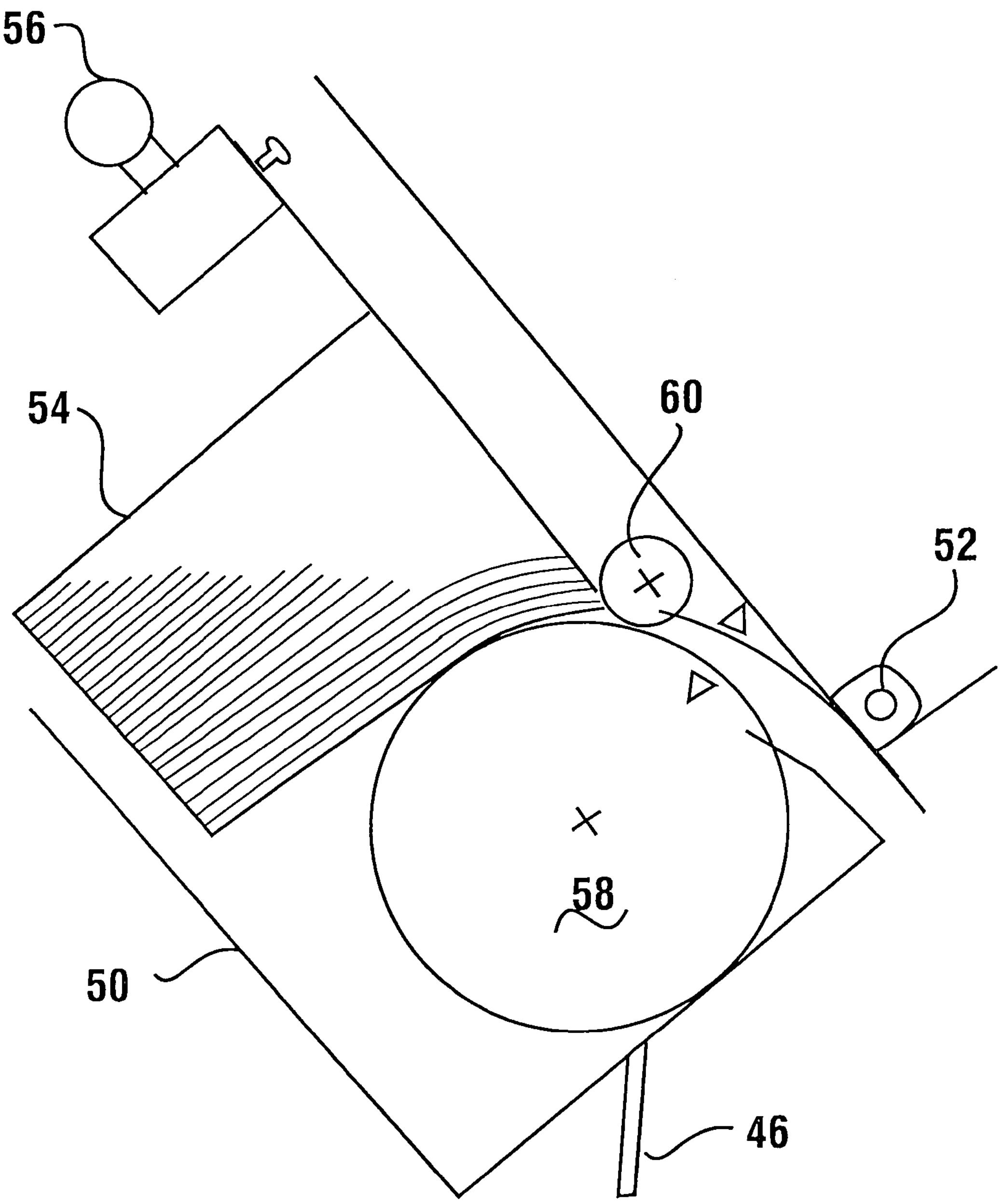
FIG. 6 is a view similar to FIG. 5 but showing the currency dispenser in a position for adding or removing currency therefrom.

As shown in FIGS. 4-6, bill dispenser 42 has an enclosure 50 that is movably mounted in supporting connection with the housing through a pivot 52. Enclosure 50 which serves as a cash holding device may house a stack of currency bills 54. In the operative position of the dispenser 42, stack 54 is biased by a pusher member 56 toward engagement with a picking member 58. Picking member 58 is selectively rotated in a clockwise direction as shown in FIG. 5 to pick bills from the stack 54. One or more stripper members 60 generally prevents all but the first bill adjacent to the picking member from being moved out of the stack. In the exemplary embodiment, the stripper member 60 is mounted so that it is only movable in a clockwise direction in response to force applied by an adjacent bill. In the exemplary embodiment, picking member 58 and stripper member 60 comprise a plurality of transversely disposed, generally disc shaped members. This enables bills to be engaged and stripping force applied at a plurality of discrete locations.

In an exemplary embodiment a doubles detector 62 enables sensing the thickness of a bill passing adjacent thereto. Signals from the doubles detector 62 enable a controller in the machine to determine if a double or other multiple note is being picked. In an exemplary embodiment if a multiple note is detected as being picked, the controller operates to reverse the direction of picking member 58 so that it is rotated by motor 48 in a counterclockwise direction. When this occurs the bills are returned into the stack 54. This action is facilitated by the movement of stripper member 60 which in the exemplary embodiment is enabled to readily rotate in the clockwise direction as shown. The controller may thereafter make further attempts to pick a single note. Single notes that are properly picked are moved from the stack through the delivery slot 44. In other embodiments double notes or other irregular notes may be diverted and stored inside the housing for later removal.

In the exemplary embodiment shown, the pusher member 56 biases the stack through action of the force of gravity acting on the pusher member. As shown in FIG. 4, the pusher member 56 is guided to move along a slot 64. The slot 64 in the exemplary embodiment enables the pusher member to move relatively readily so as to maintain a biasing force against the stack during operation of the machine. Of course in other embodiments other approaches may be used.

When it is desired by a merchant or other operator to add or remove bills from the stack 54, the enclosure 50 may be moved by the handle 56 to rotate about pivot 52. The enclosure 50 is rotated counterclockwise from the non-access position shown in FIG. 5 to the access position shown in FIGS. 4 and 6. In this position the pusher member 56 may be readily operatively disengaged from the stack 54. The bills in stack 54 may be either added to or removed by the person servicing the machine. For example a merchant may wish to add additional bills so that the machine may continue in operation. Alternatively if a merchant is closing their facility for the evening or the weekend, they may wish to remove all of the bills from the machine. In either case this is readily done and once the operation is complete, the dispenser is returned to the operative position shown in FIG. 5. In the exemplary embodiment the enclosure may be moved to the access position only when the fascia is open.

In the exemplary embodiment of the machine 10, only one denomination of bills is dispensed. In some exemplary embodiments the dispenser 42 or the interior of the machine may include appropriate indicia such as stickers to indicate to the user that the machine has been configured to dispense a particular denomination of bills. For example if the machine was configured at the time of assembly to dispense $20 bills, appropriate stickers may be included on the bill dispenser 42 or in the interior area 40 of the machine to remind the merchant to only place the proper denomination of currency in the machine. Of course in other embodiments other approaches may be used. For example a switch device may be provided in the interior of the housing for a merchant to set an indication of the denomination of bill being stored in the machine. Other embodiments may dispense multiple denominations. Other machines may automatically verify the type of currency placed in the machine such as is shown in U.S. Pat. No. 6,131,809 the disclosure of which is incorporated by reference.

Alternatively or in addition, appropriate sensors may be provided in or adjacent to bill dispenser 42 to sense the denomination of currency being dispensed. This may be done for example using radiation type sensors and appropriate programming within the controller of the machine. The controller may operate to verify that bills being dispensed have properties that are consistent with the denomination of currency that the machine has been configured to dispense. In the event of a malfunction the controller of the machine may be programmed to disable further operation and provide an indication to the merchant such as through an output on the display, a phone or e-mail type message to the merchant from the machine, and/or a message to a transaction processor from the machine. Of course these approaches are exemplary and in other embodiments other approaches may be used.

Figure 8:
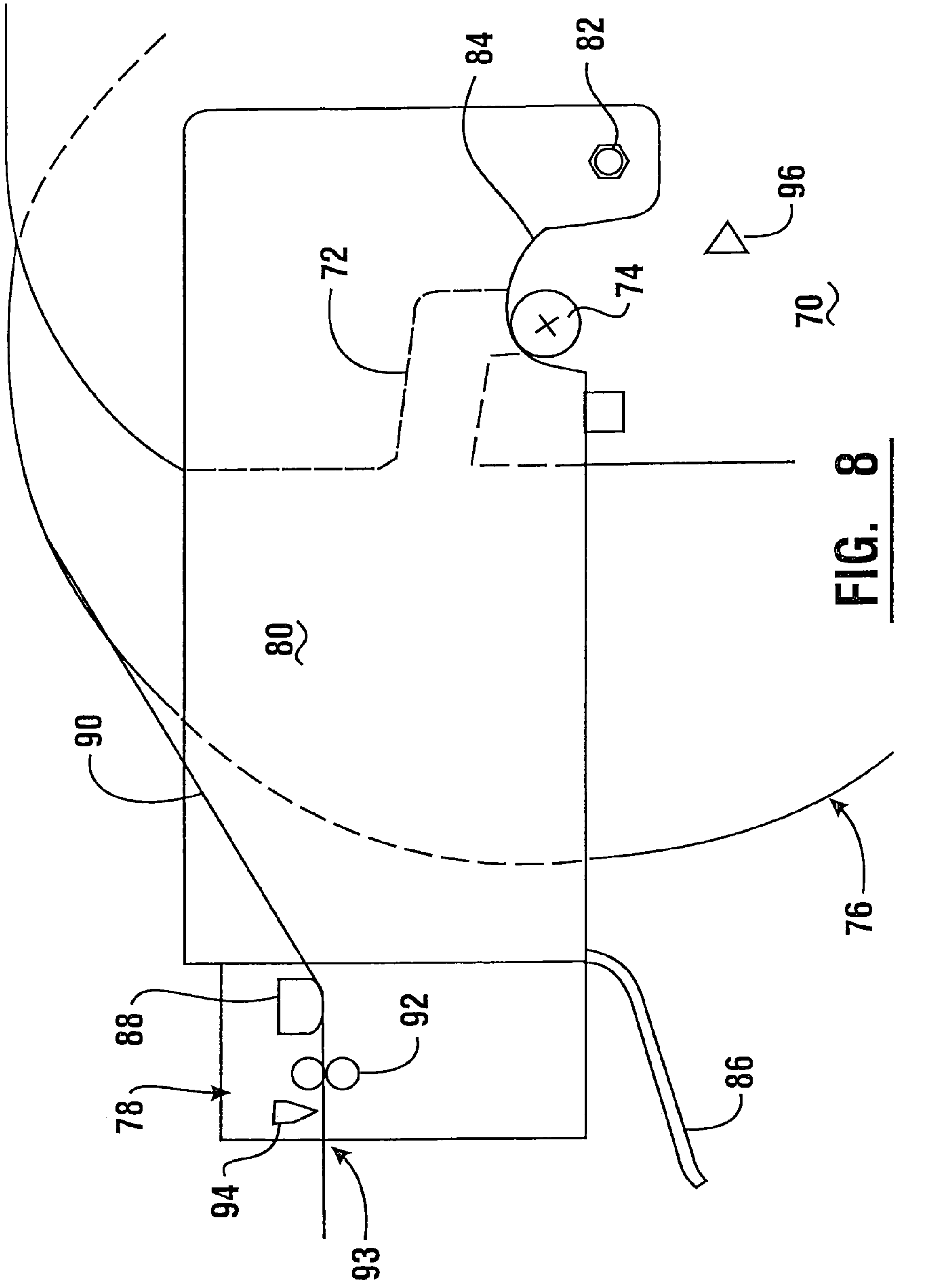
FIG. 8 is a schematic side view of the receipt printer in an operative position.

In an exemplary embodiment, the interior area 40 further includes a receipt printer generally indicated 66 which is operative to print documents. Receipt printer 66 includes a support bracket 68. In the exemplary embodiment support bracket 68 is a generally U-shaped bracket with a pair of upward depending legs 70. As best shown in FIG. 8, each of the legs 70 includes a slot 72 therein. In the exemplary embodiment slot 72 is sized for accepting a spindle 74 therein. Spindle 74 supports a roll 76 of receipt paper which in the exemplary embodiment is thermal paper upon which indicia may be printed.

Figure 7:
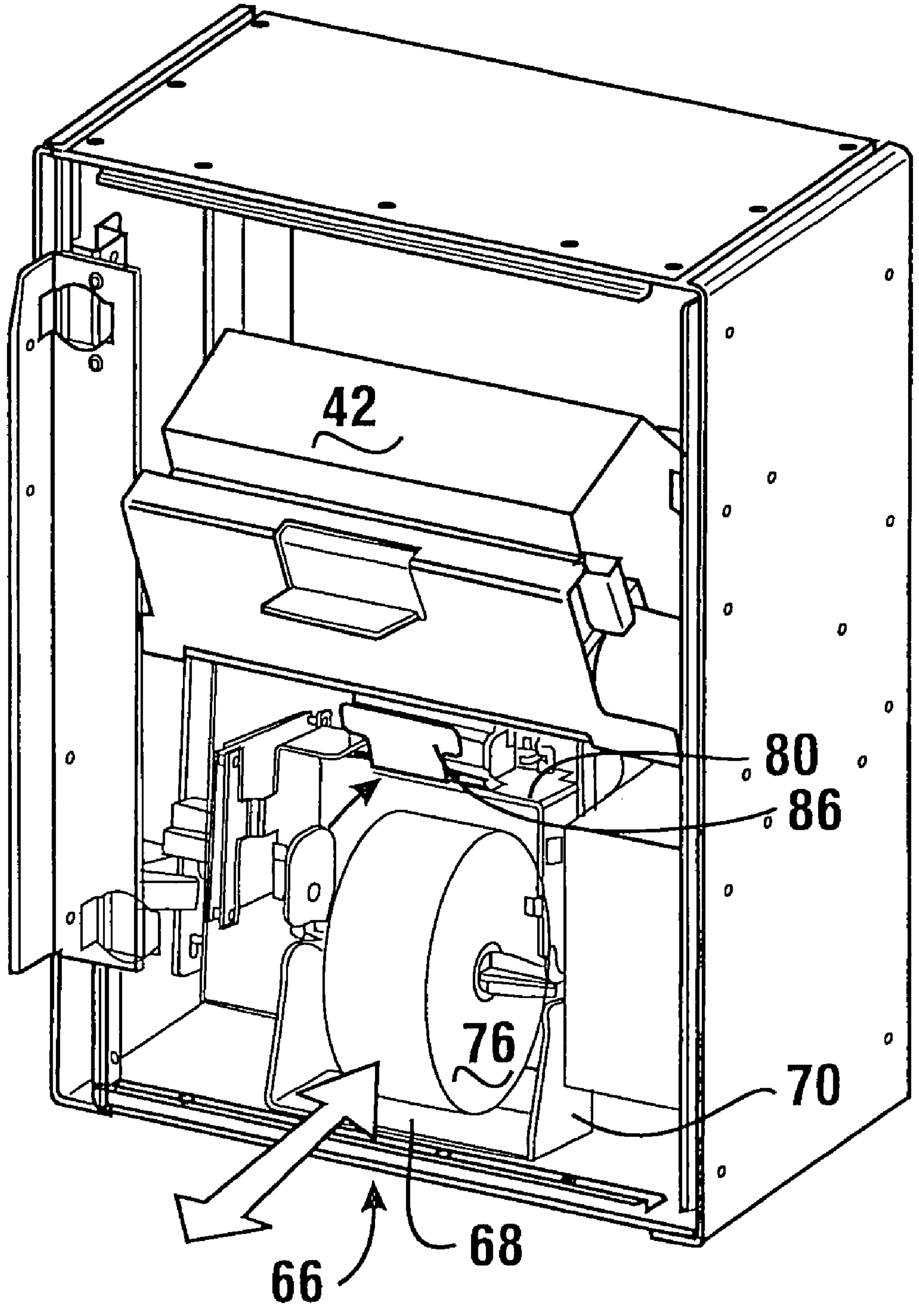
FIG. 7 is a view similar to FIG. 3 but with the receipt printer moved to facilitate installation or removal of a paper supply roll.

A print head 78 is mounted in supporting connection with a movable bracket 80. As best shown in FIG. 8, bracket 80 is movably mounted in supporting connection with legs 70 through pivots 82. When the print head 78 is in the operative position shown in FIG. 8, a bounding surface 84 on bracket 80 is positioned to hold the spindle 74 in position within the slots 72. However when the bracket 80 is moved upwardly to the position shown in FIG. 7, the spindle and supporting roll are readily enabled to be installed or removed from the slot 72. This facilitates changing the paper roll. Bracket 80 has a handle portion 86 in operative connection therewith. The handle portion 86 facilitates manually moving the bracket 80 between the operative position of the print head 78 shown in FIGS. 4 and 8, and the roll removal or replacement position shown in FIG. 7.

As represented in FIG. 8, print head 78 includes a thermal printing device schematically indicated 88. The thermal printing device in the exemplary embodiment is operative to produce indicia such as numbers and letters on a web 90 of thermal paper unwound from roll 76. The thermal printing device is operative to produce various types of indicia as are required for receipts or other documents produced by the machine.

In the exemplary embodiment the print head 78 further includes a paper moving drive mechanism 92. The drive mechanism 92 is operative to selectively move the paper. The drive mechanism 92 moves the paper web in coordinated relation with the production of indicia by the thermal printing device 88 so as to properly produce receipts and other documents for the users of the machine. In the exemplary embodiment, print head 78 further includes a cutter mechanism schematically indicated 94. The cutter mechanism 94 is selectively operative to cut the web 90 appropriately so as to provide each receipt from the machine as a separate sheet. In addition as schematically represented in FIG. 8, printer 66 includes a roll sensor 96. The roll sensor 96 is operative to sense the amount of paper remaining on paper roll 76 which is used by the machine controller to determine when the roll has reached a point where replacement is required. Roll sensor 96 in various embodiments may be a mechanical, radiation or other appropriate type sensor for sensing that the roll is approaching depletion. In embodiments of the invention the controller may be operative to give an indication to the merchant and/or to send a message to the merchant or transaction processor when paper replenishment is required.

As represented in FIG. 4, the print head 78 includes an outlet 98. In the operative position of the print head and the fascia, the outlet 98 is in aligned relation with the receipt delivery slot of the delivery pocket. As a result receipts in the exemplary embodiment are moved directly from the print head through the receipt delivery slot and to the customer. It should be understood that this configuration is exemplary and in other embodiments other approaches and configurations may be used. Further while the exemplary printer is described as printing receipts, embodiments may print other types of documents such as coupons, vouchers, scrip, checks, money orders or other documents.

In the exemplary automated banking machine 10, the interior area 40 further includes at least one controller 100 and a power supply 102. The power supply 102 provides power to components in the machine so as to enable the operation thereof. In the exemplary embodiment the power supply provides generally low voltage DC power to components in the machine while being supplied with common AC power in the form of standard household current.

Figure 9:
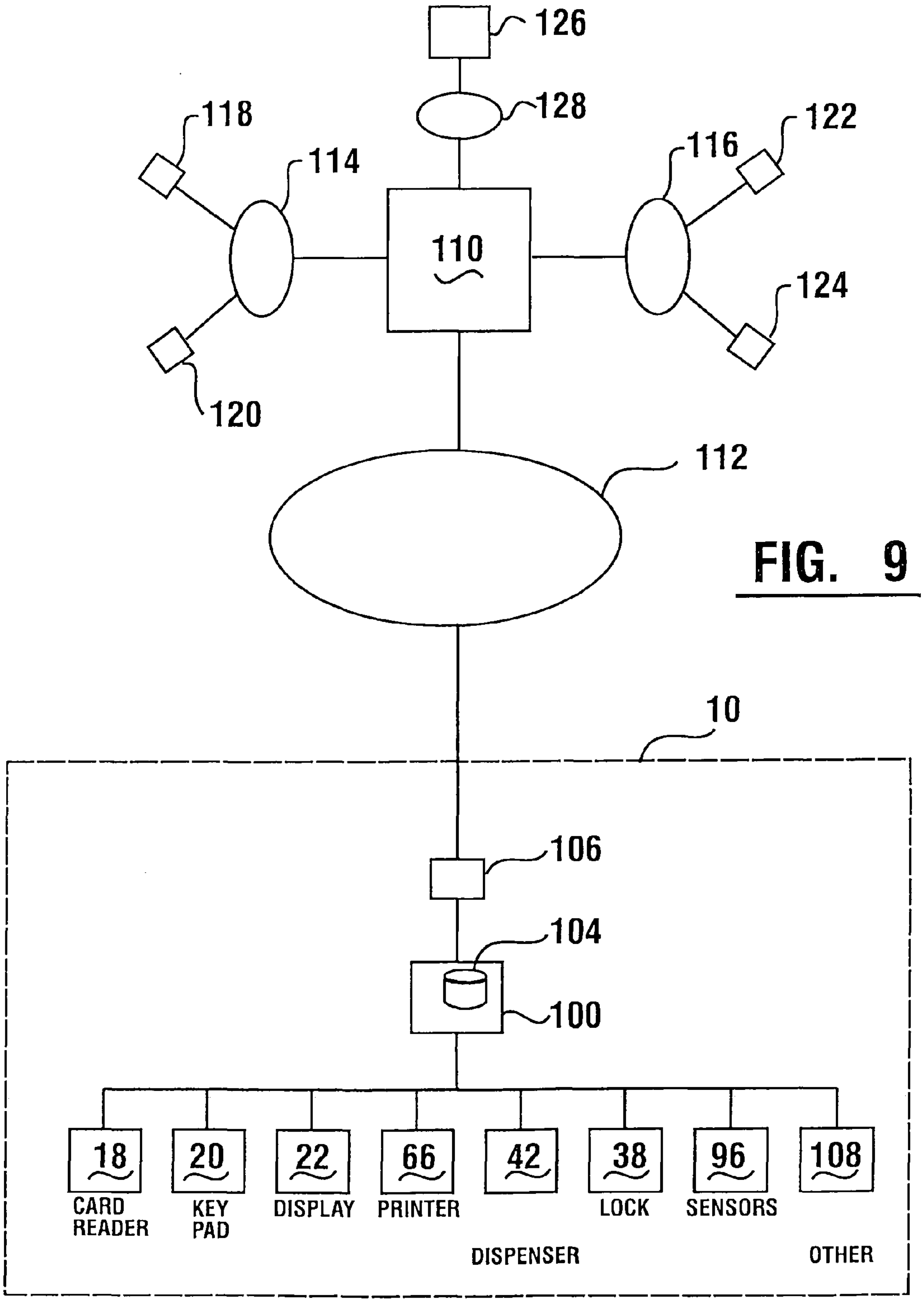
FIG. 9 is a schematic view of the automated banking machine and the system for carrying out banking transactions in which the machine is operated.

The controller 100 in the exemplary embodiment is in operative connection with the devices in the machine that operate to perform transactions. In the exemplary embodiment the controller 100 includes one or more processors which operate to control the dispenser, printer, input and output devices, communication devices and other devices in the machine. In the exemplary embodiment the controller 100 has in operative connection therewith at least one memory, schematically indicated 104. The memory 104 includes configuration data and other programs, instructions and data which the controller uses in operation of the machine. As shown in FIG. 9 the controller 100 is also in operative connection with a communications device 106. In the exemplary embodiment the communications device 106 comprises a modem which enables communication of the automated banking machine 10 with external systems and devices, including systems which can authorize transactions. It should be understood that the schematic representation of machine 10 shown in FIG. 9 is exemplary, as are the types of devices shown therein. In other embodiments of the invention the automated banking machine may include different or additional types of devices which are operative to carry out transactions for users of the machine. Such additional devices may comprise a wireless communication port and/or a document scanner device, for example which are later discussed herein. Such additional devices may also include devices such as cash acceptors, money order printers or other types of transaction function devices. Such additional devices are schematically represented in machine 10 by device 108 which is operatively connected to controller 100.

In the exemplary embodiment automated banking machine 10 communicates with a transaction switch 110. Transaction switch 110 is remotely located from the ATM and is in operative connection therewith through a network schematically indicated 112. In the exemplary embodiment the network 112 is a telephone system. The controller 100 communicates through the modem 106 on a dial-up basis with the transaction switch 110. In some embodiments the machine may also communicate on a dial-up basis with a merchant's phone or computer to give an indication of a condition at the machine. Of course it should be understood that in other embodiments other means of communicating messages between the controller and an entity which can process electronic transaction messages may be used. This may include for example a dedicated data line, interne connection, local area network, wide area network or other communications network. The exemplary embodiment of the machine communicates with an external system(s) at one or more predetermined system addresses. For purposes of this disclosure a system address may include a phone number, network address or other designator which indicates or identifies a particular resource with which the machine communicates.

In operation of the system of an exemplary embodiment the transaction network switch does not directly debit the accounts of users at the machine. Rather the transaction switch 110 includes one or more computers which operate to direct messages appropriately to one or more other networks schematically represented 114-116. These other networks may be transaction networks such as Cirrus®, Plus®, Money Station® or MAC® which operate to route transaction messages to computers schematically represented 118, 120, 122 and 124 which can authorize transactions. These computers may commonly be located at financial institutions, credit card organizations or other operations which may indicate whether a consumer seeking to use an automated banking machine is authorized to conduct the requested transaction and to track such transactions.

In the exemplary embodiment the transaction switch 110 operates to receive messages from the automated banking machine 10. Commonly such transaction messages will include requests to conduct transactions such as a cash withdrawal or an account balance inquiry. Based on the information input by a user to the machine, such as the account number information included on the user's card, the transaction switch operates to route the transaction message to the appropriate network and to the appropriate transaction authorization computer. The authorization computer is operative to determine if the customer is authorized to conduct the transaction requested, and to return a message to the transaction switch indicative of whether the transaction should proceed. The transaction switch then routes response messages back to the automated banking machine 10. The machine 10 then operates in accordance with the response message.

Generally the response message will indicate that the transaction is authorized and in that case will carry out the transaction for the customer. For example if the customer has requested to dispense an amount of cash, the banking machine 10 will operate in accordance with the programming of controller 100 to operate the dispenser to dispense the requested amount of cash and to provide the customer with a receipt for the transaction. The automated banking machine will also generate a completion message which is delivered through the transaction switch 100 to the appropriate computer to indicate whether the transaction was carried out successfully. The data in the completion message indicating that the transaction was successfully carried out indicates that the customer's account should be charged for the amount of cash dispensed. Of course it should be understood that in situations where the transaction is denied, the response message will cause the controller to operate to provide an appropriate output through the display 22 advising the customer of this fact.

In the exemplary embodiment, the automated banking machine 10 operates as a cash dispenser and provides customers with only two transaction options. These transactions are a cash withdrawal and a balance inquiry. Of course in other embodiments lesser or greater numbers of transactions may be provided. In alternative embodiments the automated banking machine 10 may also be operative to provide promotional or other messages to a customer. This may be done through one of the output devices such as the display 22 or the printer 60. For example the display may provide a promotional message related to items such as discounts on items that are offered by the merchant. Alternatively the output device may offer promotional information on goods or services that a customer may acquire from a third party. The customer may also be provided with the option of receiving a coupon or a voucher which may be provided by the printer in the machine 66.

The promotional messages provided may be generally directed to consumers or may be specifically targeted. Such messages may be specifically targeted to the particular merchant transaction environment or may be directed to the particular consumer. In the exemplary embodiment this is accomplished through data included in messages sent to the machine 10. This is represented in the exemplary embodiment by a customer relationship management (CRM) computer 126 which is connected to the transaction switch 110 through a network 128. It should be understood that in embodiments of the invention the CRM computer may be combined with one or more of the computers of the transaction switch. Alternatively the CRM computer may be remotely located from the transaction switch and may communicate therewith through a public or private network. Alternatively the CRM computer in other alternative embodiments may not communicate through the transaction switch as schematically represented in FIG. 9 but may instead communicate directly or through other intermediate computers with the automated banking machine 10. The CRM computer in some embodiments may be a computer operated by the merchant. Numerous approaches may be taken in embodiments to achieve the delivery of promotional messages from the machine 10.

Alternative machine embodiments may be configured to operate responsive to portable devices such as PDAs and/or cell phones. For example embodiments of the machine may include a wireless communication port which enables wireless communication with such a portable device. Such portable device may operate to provide data to the machine that would otherwise be input through other input devices such as the card reader, function buttons and/or keypad. In some embodiments the portable device may have an application that enables a user to stage or perform all or a portion of a requested transaction prior to arrival adjacent the machine. The machine upon coming into communication with the portable device may carry out steps in the transaction including exchanging the necessary messages with the networks to complete the requested transaction and/or the dispensing of cash.

Alternatively or in addition, embodiments of the machine may be in connection with an interactive voice response system through which users of portable devices such as cell phones can input transaction requests. This may include for example contacting a particular system at a phone number that presents a menu of transaction options through simulated human voice prompts. The user may provide inputs to select transaction types and data for carrying out transactions. such inputs may be voice or key inputs for example. The transaction requests can be approved and/or processed through operation of the remote system. If the transaction request includes the dispense of cash, the cash dispense may be accomplished when the user is adjacent to the machine. Such systems may include the user providing one or more inputs to the machine and/or cell phone to confirm that they are adjacent the machine and/or are ready to receive cash or another transaction. Such inputs may include numbers, cards, articles, biometric or other inputs and/or combinations thereof.

Alternative embodiments of the machine may include a scanning device. Such a scanning device may be used for scanning financial instruments such as checks, money orders, vouchers or other documents having or redeemable for value. Such scanned documents may produce data which can be used for conducting transactions. For example, a check can be scanned, and responsive to inputs to the machine, operation of the controller and the exchange of messages with other computers, the machine may cause value to be given to the user for the check. This may include crediting a user's account for the value of the check. The delivery of value may include dispensing cash for all or a portion of the value of the check. In some embodiments accepted checks or other instruments may be held within the machine. In other embodiments checks or other instruments may be marked to indicate that they have been redeemed and returned to the user.

In alternative embodiments the machine may include a cash acceptor. The cash acceptor may be used to receive currency bills and provide value to the user in exchange therefore. Such value may include providing a credit to a user's account. Alternatively, the value may be applied to having the machine provide to the user one or more items such as a money order, check, gaming materials or other item having value. The machine may include appropriate printers or other devices that operate responsive to the controlled and appropriate inputs to produce and/or deliver such items to a user of the machine.

It should be understood that these transactions, methods and approaches are exemplary and in other embodiments other transactions, methods and approaches may be used.

Figure 10:
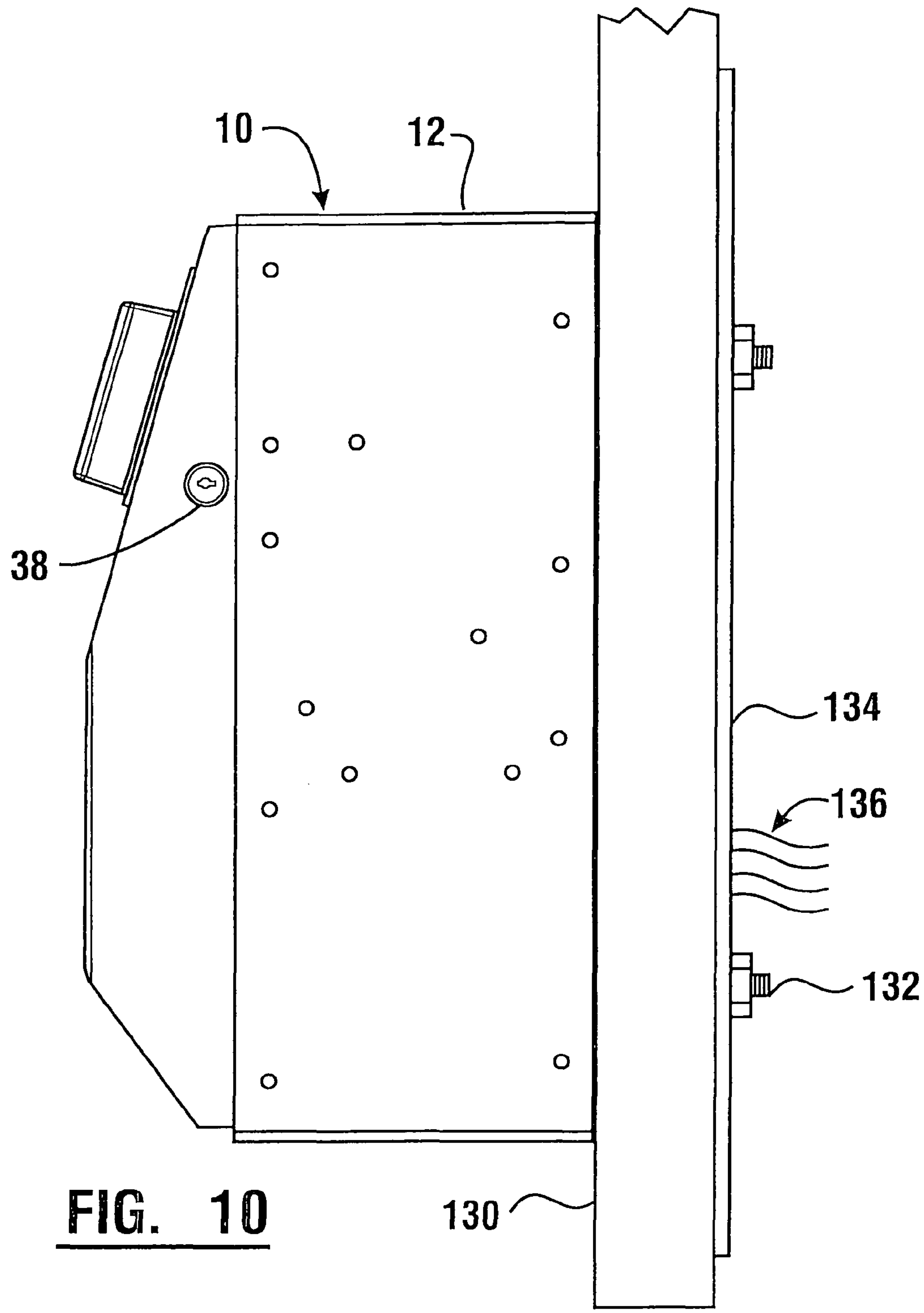
FIG. 10 is a side view of the automated banking machine shown in FIG. 1 mounted to a wall.

The exemplary embodiment of automated banking machine 10 is suitable for economically being installed and operated in a plurality of ways. For example as shown in FIG. 10 the automated banking machine may be mounted through a wall 130. In this mounting arrangement fasteners 132 are extended through the wall 130 from the inside of the housing 12. A security structure such as one or more security plates 134 is positioned on an opposed side of the wall to resist forces that might be applied in an attempt to tear the machine from its wall mounting. The security plate 134 may include openings (not separately shown) enabling connections 136 such as power connections and a communication line to pass into the housing. As can be appreciated the wall mounting shown in FIG. 10 may be quickly accomplished with relatively little effort. The locking capabilities of the housing further prevent unauthorized persons from gaining access to the fasteners from the consumer side which provides a security measure.

Figure 11:
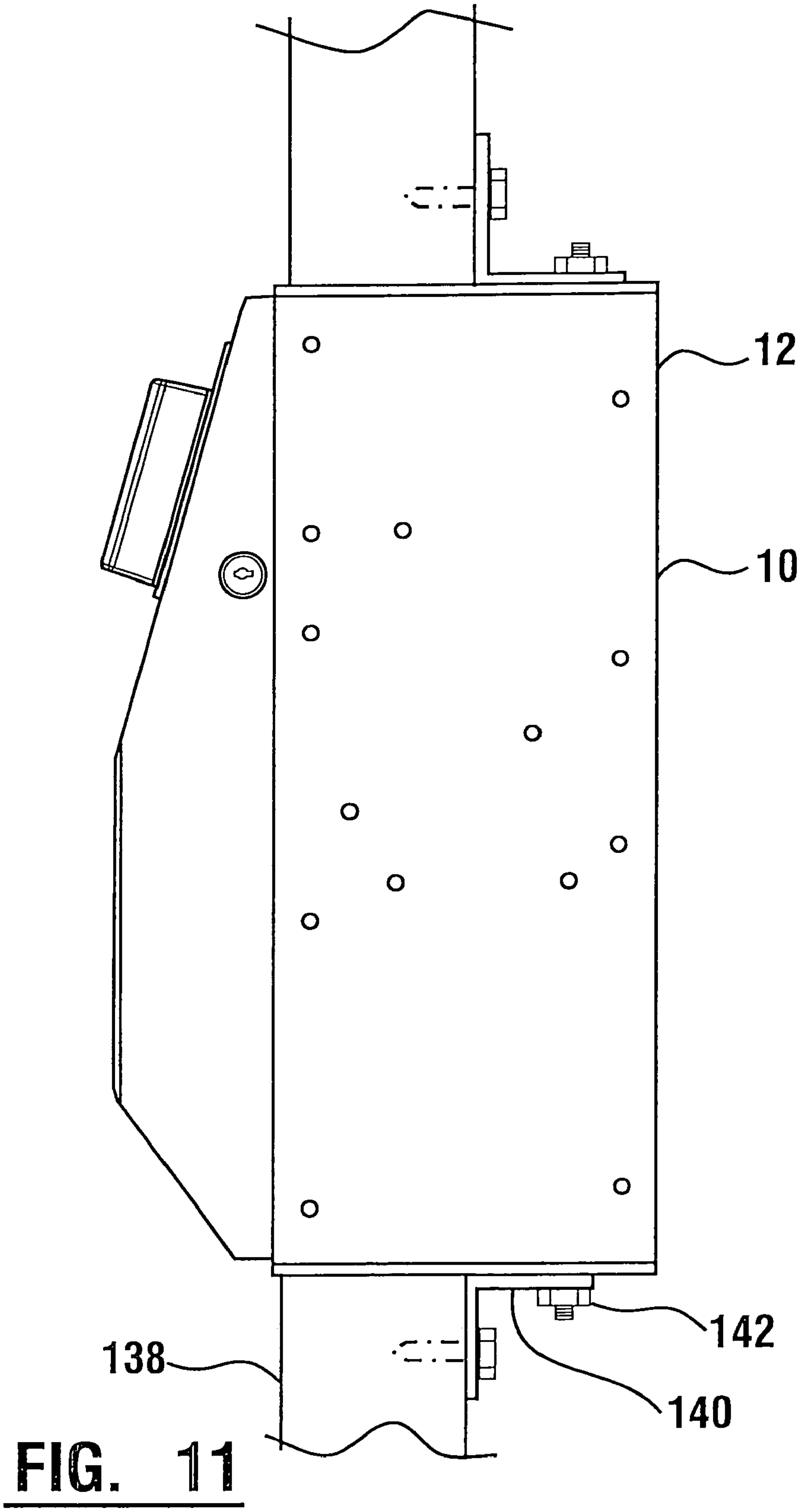
FIG. 11 is the automated banking machine shown in FIG. 1 mounted in a wall.

FIG. 11 shows exemplary automated banking machine 10 mounted in a wall 138. The relatively small dimension of the exemplary embodiment of the machine 10 enables the machine housing 12 to fit between standard spaced wall studs. In the embodiment shown brackets 140 are positioned on the interior side of wall 138 and fasteners 142 hold the machine housing to the brackets. Again as is the case with on-the-wall mounting shown in FIG. 10, the in-wall mounting shown in FIG. 11 restricts access to the fasteners by unauthorized persons. However, the mounting configuration of the exemplary embodiment enables the machine to be readily installed and replaced.

Figure 12:
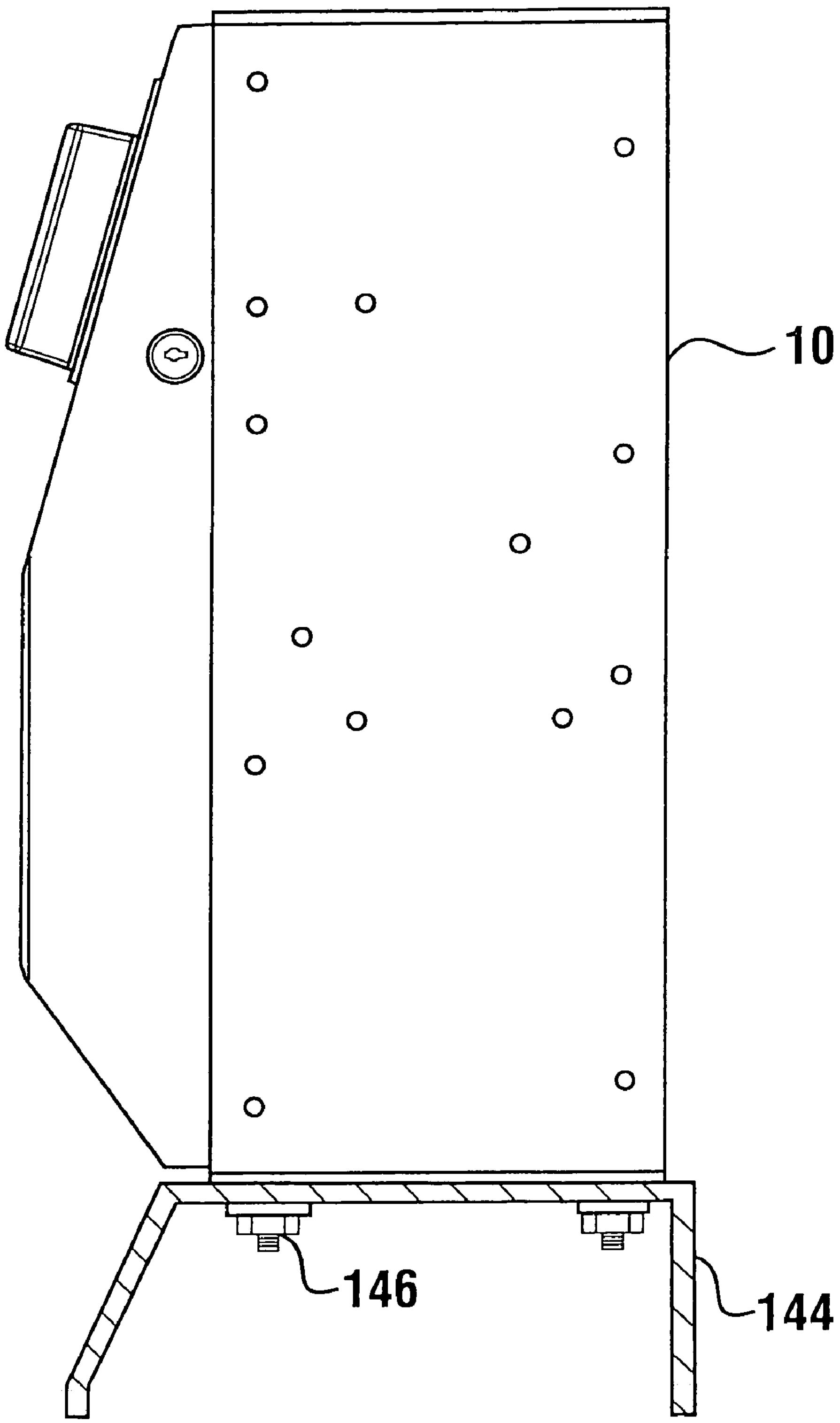
FIG. 12 is a side view showing the automated banking machine of FIG. 1 mounted on a pedestal.

FIG. 12 shows yet a further alternative mounting of the machine 10. In FIG. 12, machine 10 is mounted through a bottom wall on a pedestal 144. Fasteners 146 extend from the housing of the machine and engage the pedestal 144. In this embodiment the pedestal is preferably secured to a floor or other adjacent structure to prevent the removal of the machine with the pedestal by unauthorized persons. Again in this embodiment access to the fasteners is restricted to authorized persons who can gain access to the interior of the machine or the interior of the pedestal.

It will be appreciated that embodiments may include numerous approaches to mounting the machine. The three examples shown are exemplary of how the machine may be mounted through various surfaces of the housing. Other approaches to mounting the machine may be used. As will be appreciated the ability to economically install and replace the machine makes it easier to install automated banking machines in more locations where installation of other types of automated banking machines may be impractical. Such approaches also make it feasible to replace a malfunctioning machine rather than to repair it at the merchant site.

Figure 13:
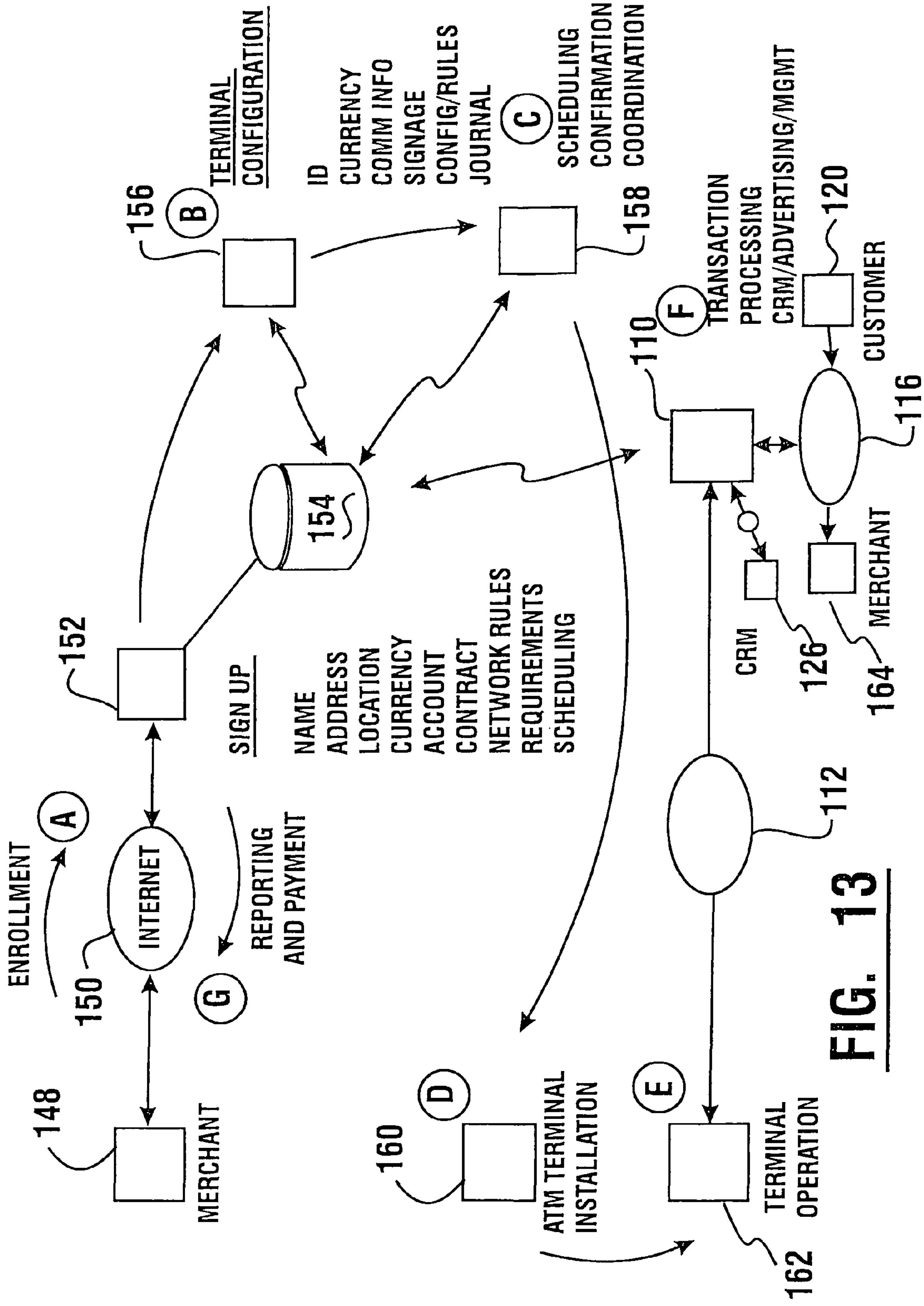
FIG. 13 is a schematic view of steps in an exemplary method of deploying and operating an automated banking machine.

FIG. 13 schematically represents an exemplary method for distributing and operating automated banking machines, such as automated banking machine 10. In this exemplary method merchants, which is used in this description to refer to any persons or entities wishing to operate automated banking machines in their establishments or operations, are provided with the automated banking machines at little or no initial cost. It is generally contemplated that payment by the merchant to the machine provider, if any, will not represent the value of purchasing or leasing the machine. The merchant may then receive a share of revenue derived from transaction fees obtained from transactions conducted at the machine without a significant initial investment. The provider of the automated banking machine is further assured that the automated banking machine will remain connected to the particular transaction switch from which the provider of the machine also derives revenue. This is because as previously explained, the exemplary embodiment of the automated banking machine is configured to specifically communicate only with the particular transaction switching entity. This may be accomplished in exemplary embodiments by not including a device within the machine housing that enables persons not authorized by the provider of the machine to change the configured system address(es). This may include making the machine so as to not include a media reading device such as a disk drive or memory card reader that can be operated in cooperation with the controller by persons not authorized by the machine provider to change configured system address or other data. As can be appreciated various approaches may be taken to not having a device in the machine that can be operated to change the system address(es). Such approaches may include for example, providing no way to change system addresses for the machine without changing machine hardware, or programming the controller or other devices to only allow authorized representatives of the machine provider who can input secret codes and/or use special tools to change system address(es) for the machine.

In the exemplary method represented in FIG. 13, a merchant 148 applies to receive a machine from the provider. This application is done at an enrollment step (a) which in the exemplary embodiment is conducted over a wide area network such as the Internet 150. During the enrollment step the merchant communicates with one or more servers 152 which are operated by or for the benefit of the machine provider. In an exemplary embodiment the merchant receives the machine at no cost, but is first required to qualify by answering a series of questions and providing information. This may be done through a web interface provided by the server 152. Such qualification information which may be required from the merchant, may include information such as the name, billing address and contact information for the merchant. The qualification information may also include the nature of the merchant's business and the particular street address where the machine is to be installed. Other information may also be obtained from the merchant in order to decide if the merchant is to be qualified, such as the volume of business that the merchant does, the types of products that the merchant provides, bank references and other information that may be useful in determining if the merchant is likely to generate profits for the provider or in operating the machine.

During the qualification process the merchant may also be required to provide other information. This may include for example account information. The account information may include the bank account of the merchant where the merchant wishes funds to be deposited. As can be appreciated, the merchant will want to have deposited in their account the funds to reimburse the merchant for currency placed by the merchant in the machine. In addition the merchant may want to designate a particular account for purposes of receiving the merchant's share of any transaction fees or additional amounts that may be due the merchant.

The qualification process may also involve advising the merchant of the terms and conditions surrounding receipt and/or use of the machine. In some embodiments ownership of the machine may be transferred to the merchant. Alternatively the merchant may be licensed to use the machine which remains the property of the machine provider. Alternatively the machine may be provided to the merchant under a lease structure. Particular contract terms and conditions may be presented to the merchant in the exemplary embodiment. The merchant may also be advised of the particular network rules that are applicable to participating in the transaction processing network of the ATM provider as well as other networks which may be accessed through the transaction switch. In the exemplary embodiment the merchant may enter into binding legal agreements including the particular contract terms presented online using an electronic signature process. Alternatively the merchants may be presented with paper, fax or other forms for concluding a written contract and/or for providing other information. In some embodiments, the merchant and the ATM provider may communicate in a secure manner such as by using digital certificates, public key encryption or other methods to verify the identity of one or both entities communicating electronically. Various approaches may be used either initially or after the merchant is qualified, to provide an adequate level of security which is appropriate in the particular circumstances.

The qualification process in some embodiments may include either in the initial session or in subsequent sessions, communication with the merchant concerning the requirements for locating the machine as well as coordination of installing appropriate utilities, such as the power line and telephone line required by the exemplary embodiment of the machine 10. In the exemplary form the ATM provider assumes responsibility for installing the machine and making the utility connections. However, in other embodiments the merchant or a third party may have this responsibility.

It should be understood that the qualification process described is exemplary. In other embodiments other or different information may be exchanged in one or more sessions between the merchant and the servers operated by the ATM provider. The qualification process may involve additional steps such as receiving information from references, conducting a site visit or taking other appropriate actions in one or more electronic or in-person sessions. The process may also include providing the necessary information on where telephone or e-mail messages concerning machine status will be directed. The process may also include selecting advertising content, contracting with content providers and/or CRM services, or acquiring the necessary data which allows the merchant to provide certain advertising content and/or to perform CRM functions. The qualification process may also involve giving notice of or requiring the merchant's agreement to certain policies and procedures related to privacy of transaction information. The particular nature of the qualification process and the data acquired and stored by the system will depend on the particular needs of the merchant and the ATM provider to implement the transaction system.

In the exemplary method the information related to the merchant and the particular ATM will be stored in one or more data stores schematically indicated 154. The data store may be in or accessible by one or more computers operated by the ATM provider or other entities associated with carrying out the method. As represented in step (b) the data in the data store 154 is used in a configuration operation 156. In the configuration operation which may be performed at a manufacturing plant, service facility or other facility, the automated banking machine is programmed with the information necessary for it to operate in the system. This may include for example, programming an identification number which identifies the terminal through correlation with other data stored in the database. Such identification information enables information such as the location where the terminal will be installed, the merchant operator, the merchant's account and contact information as well as other data, to be recovered from the data store. This enables other activities and transactions concerning the terminal to be tracked and coordinated.

Other terminal configuration data that may be programmed into the banking machine in the exemplary embodiment, is information concerning the type of currency to be dispensed. The programmed information may also include appropriate programming so that a verification sensor, doubles detector or other items may operate to verify that proper currency is being dispensed, or detect doubles or to detect other status information or conditions. In the exemplary embodiment the configuration data will include programming that the banking machine will dispense only U.S. $20 bills. Of course in other embodiments other bill types and denominations may be used.

Additional configuration data programmed in the exemplary embodiment may include communications information. This may include the system address data. In the exemplary embodiment this includes the phone number corresponding to the transaction switch 110 that the banking machine will communicate with to carry out transactions. The communications information may also include information concerning data transmission rates and other settings for the modem that enables communication. Alternative communications information such as alternative phone numbers may also be programmed into the machine so that the controller may carry out alternative contact and communication in the event that the primary method of contact is unavailable. In alternative embodiments the communications information configured in the machine may further include network addresses and/or information concerning servers or computers which provide transaction processing capability, status reporting, instructions for the display of promotional or other information to users or other functions. Further configuration data may include contact and timing information for delivering electronic records of transactions conducted such as electronic journals of transactions stored during a particular time period. Other information may include communications information for communicating status information, marketing information or other data that is related to the terminal. This may include the information necessary for the machine to communicate with the merchant by phone or e-mail as previously discussed. The particular configuration data will depend on the particular type of machine and the system on which it is being used.

Also included at the configuration operation of the exemplary embodiment is programming the machine to carry out any particular steps that may be unique to the usage of the machine. For example in some states only automated banking machines operated by banks are permitted to carry out a balance inquiry transaction. Based on the location data concerning the machine, the merchant entity involved and/or other information, decisions can be made as to whether particular transactions are to be enabled or disabled at the machine. Likewise certain state or local requirements may dictate the display of information to a user of the machine. Such information may include for example advance notice of transaction fees and an opportunity to decline the transaction once the fee is displayed, or limits on transaction fees. Such local requirements may be programmed into the data store associated with the controller in the machine at the configuration operation. The configuration operation may also program additional parameters and requirements which are necessary for the operation of the machine.

The configuration operation may also include particular requirements of the installation. This may include for example, applying certain signage on the machine. It may also include for example placing particular openings in the housing appropriate for the type of installation to be made. It may include for example providing the necessary hardware with the machine to achieve the desired mounting, or additional requirements. It should be understood that the nature of the activities that need to be conducted in the terminal configuration operation will depend on the particular circumstances of the system and its operation.

As represented in step (c) the information in the data store 154 is also used in the exemplary embodiment to coordinate with the merchant and any necessary third parties concerning the installation of the machine. This is done by a coordination function 158. It should be understood that the coordination function may be ongoing before, during or after the configuration operation depending on the particular system.

In the coordination function of the exemplary embodiment, arrangements are made for the necessary communication line with a third party provider such as a telephone company. The coordination function may make any necessary arrangements related to permits, contractors or other steps necessary to achieve installation or operation of the machine. In addition the coordination function may make necessary arrangements to assure that electrical power or other connections to the machine are available at the time that the automated banking machine is to be installed at the merchant location. In the exemplary embodiment the ATM provider provides the necessary utilities and communication lines for operation of the machine, and manages the relationship with the merchant so as to achieve the provision of those capabilities. Of course in other embodiments the merchant may be required to provide one or more of such items, and in such cases the coordination function may coordinate with the merchant to assure that such items are installed by the merchant.

In some embodiments the coordination function may also conduct site visits, surveys, verification or other appropriate functions to assure that the merchant properly qualifies to receive the machine as well as to assure that the automated banking machine can be properly installed in the appropriate locations. Other steps may also be taken as appropriate to increase the probability of a successful installation and/or profitable operation.

Once the configuration operations and coordination functions are completed to the degree that the merchant location is ready to receive the automated banking machine, the terminal may be installed. This is represented by a step (d) in FIG. 13. In the exemplary embodiment the banking machine installation function 160 is carried out by ATM provider personnel at the merchant facility. Of course in other embodiments of the invention, a third party may be retained for the purpose, or the merchant may accomplish these activities themselves. In an exemplary embodiment the ATM terminal installation includes mounting the terminal in the appropriate location and connecting the communication and power lines to the terminal. The terminal installation function may also include testing that the terminal is operating properly. The terminal installation function may also include providing merchant personnel with information and/or training on how to load cash and supplies into the terminal, as well as on how to make minor repairs. In addition in the exemplary embodiment the merchant 148 is enabled to obtain assistance from the machine provider through other points of contact. This may include contact via the Internet 150 as well as through a separate call center help desk for assisting merchants in operating the machines.

Once the machine is installed and the merchant loads the machine with cash, the operation function 162 is carried out using the terminal at the merchant facility. The terminal operates to carry out transactions involving the dispense of cash from the terminal to customers. The cash is periodically replenished as necessary from the cash that the merchant has available. The merchant also replenishes consumable supplies such as receipt paper as necessary.

In some embodiments the merchant may encourage the use of the machine by adopting policies that favor the use by customers of cash. This may include practices such as adopting "cash only" policies or providing discounts for the use of cash in making purchases. Merchants may also offer to pay a bounty for the particular types of bills the machine dispenses so as to offer consumers a benefit for using cash dispensed by the machine. In situations where the merchant provides services in a gaming environment, the merchant may offer gaming materials having a face value greater than the amount of cash paid. Of course other approaches may be used to increase the benefits for the merchant and/or users of having the machine available.

As previously discussed in the exemplary embodiment, transaction requests are sent from the terminal through the network 112 to the transaction switch 110. The transaction switch in the exemplary embodiment is operated by the machine provider or an entity controlled by or under common control with the machine provider. Of course in other embodiments the machine provider and the entity which acquires the transactions may have another type of cooperative relationship. This is represented by step (f) in FIG. 13.

As customers conduct transactions at the banking machine the machine provider operating the transaction switch 110 authorizes the transactions by communicating with banks of the respective customers. This is represented by bank 120. The transaction switch is further operated so that an account of the merchant at a bank 164 is appropriately credited for the funds that were debited to customers' accounts because the customers received cash dispensed from the banking machine. In the exemplary embodiment the ATM provider through operation of the transaction switch also credits to the merchant's account with the agreed share of transaction fee revenue which results due to the conduct of transactions at the machine.

In some embodiments the transaction switch may also be operated to acquire information from the banking machine related to the customers conducting transactions, and/or to deliver to the machine advertising information or promotional materials. This advertising or promotional material may be provided to all users of the machine or may be provided on a targeted basis to particular customers as previously discussed. This is accomplished through the operation of one or more connected CRM computers 126.

As transactions are conducted information concerning the transactions is accumulated in the one or more data stores 154. In the exemplary embodiment information is then provided to the merchant concerning use of their machine, payment amounts due the merchant, and/or amounts that have been deposited into the merchant's bank account. These steps of reporting to the merchant and making payment are represented by a step (g) in FIG. 13. Of course the merchant may also provide periodic information and inquiries to the ATM provider concerning the machine or the operation of the system.

In the exemplary embodiment the automated banking machine is of a type that may be provided to the merchant in exchange for little or no expenditures by the merchant. It is contemplated that in exemplary embodiments if any charge is made the charge will be substantially less than the fair market value that would be associated with a purchase or lease of the machine by the merchant. This may enable a qualified merchant to acquire a machine and/or to install machines at multiple locations, including multiple locations within a single facility. In addition in the exemplary embodiment a merchant participant does not have a substantial investment to recover before the operation of the automated banking machine becomes profitable for the merchant.

In the exemplary embodiment the automated banking machine is such that it is generally readily maintained for routine matters by the merchant. The replenishment and removal of cash and consumable items may be relatively simply accomplished as previously discussed. Further in the exemplary embodiment the relatively small amount of cash held by the automated banking machine minimizes the loss to the merchant in the event of a successful attack on the machine.

The dedicated nature of the machine to the transaction processing system of the ATM provider in the exemplary embodiment simplifies the amount of machine configuration and programming that must be done in the field. This facilitates the installation of the machine. Generally little activity beyond mounting the machine and then plugging the machine into the household current and the communication line is necessary to begin operation of the machine. In addition in embodiments where the ATM provider or other entity which has a revenue generating relationship with the operator of the transaction switch, does not retain ownership of the machine, the dedicated nature of the machine and fixed internal programming minimizes the risk that the merchant will use the machine for processing transactions through a different transaction switch which would result in loss of revenue to the ATM provider. Of course in embodiments the ATM provider may retain ownership of the machine so as to prohibit contractually as well as technologically, the making of modifications to the machine programming.

A further advantage of the exemplary automated banking machine and its mounting, is that it is enabled to be readily replaced by authorized persons. Thus for example in the event of a malfunction, the ATM provider may configure another machine with the information for the merchant location, and replace the entire malfunctioning machine. This may be readily accomplished because of the compact size and convenient mounting provided by the exemplary embodiment which enables authorized persons to open the machine housing and access fasteners holding the machine. The ATM provider may then receive the return of the malfunctioning machine, make repairs and reconfigure it for use by another or the same merchant. Numerous other useful aspects of the invention will be apparent from the foregoing description to those having skill in the relevant art.

It should be further understood that while the exemplary embodiment of the invention has been described as using an automated banking machine which is a cash dispenser, the principles of the invention may be applied to other types of automated banking machines and their associated methods of deployment and operation.

Thus the automated banking machine and associated systems and methods of the present invention, may achieve at least some of the above stated objectives, eliminate difficulties encountered in the use of prior devices, systems and methods, and attain the useful results as described herein.

In the foregoing description certain terms have been used and described as exemplary embodiments for purposes of brevity, clarity and understanding, however no unnecessary limitations are to be implied therefrom because such terms are used for descriptive purposes only and are intended to be broadly construed. Moreover, the descriptions and illustrations herein are by way of examples and the invention is not limited to the features shown and described.

In the following claims any feature described as a means for performing a function shall be construed as encompassing any means known to those skilled in the art as being capable of performing the recited function, and such terms shall not be deemed limited to the particular means shown or described for performing the recited function in the foregoing description, or mere equivalents thereof. The inclusion of an Abstract herewith shall in no way limit the scope of the claimed invention to those features mentioned in the Abstract.

Having described the features, discoveries and principles of the invention, the manner in which it is constructed and operated, and the advantages and useful results that may be attained; the new and useful structures, devices, elements, arrangements, parts, combinations, systems, equipment, operations, methods and relationships are set forth in the appended claims.

We claim:

1. Apparatus comprising:
an automated banking machine, including:
a card reader, wherein the card reader is operative to read card data from user cards, wherein the card data corresponds to financial accounts;
a lockable housing, wherein the lockable housing bounds an interior area;
a cash dispenser;
at least one processor in operative connection with the card reader and the cash dispenser,
wherein the at least one processor is within the interior area,
wherein the at least one processor includes dedicated programming,
wherein the programming causes the cash dispenser to dispense cash from the machine responsive to communication of at least one message only between the machine and at least one remote system,
wherein the at least one processor is configured to prevent a changing of the programming that would enable communication of the at least one message between the machine and any remote system other than the at least one remote system.

2. The apparatus according to claim 1 wherein the at least one remote system is associated with a system address.

3. The apparatus according to claim 2 wherein the system address includes a network address of a transaction switch.

4. The apparatus according to claim 1 and further comprising a wireless communications port in operative connection with the at least one processor, wherein the at least one processor is in operative connection with at least one remote device through the wireless communication port.

5. The apparatus according to claim 4 wherein the wireless communication port is adapted to communicate messages with at least one portable handheld device.

6. The apparatus according to claim 1 wherein the housing is configured to be fully supported by connection to a wall.

7. The apparatus according to claim 6 wherein the housing is configured to be mounted to a wall through releasible fasteners, wherein the housing further includes a lockable access door, and wherein the releasible fasteners are only removal accessible from outside the housing upon opening the lockable access door.

8. The apparatus according to claim 7 wherein the machine further includes a keypad and a locking mechanism, wherein the keypad and the locking mechanism are in operative connection with the at least one processor, and wherein the access door is unlocked through operation of the locking mechanism responsive to at least one input to the keypad.

9. The apparatus according to claim 8 and further including a document scanner in supporting connection with the housing and in operative connection with the at least one processor.

10. The apparatus according to claim 9 wherein the document scanner is adapted to scan checks.

11. The apparatus according to claim 9 wherein the at least one processor is operative to cause the machine to dispense cash responsive to the scanning of a check with the document scanner.

12. The apparatus according to claim 1 and further comprising a printer in operative connection with the at least one processor, wherein the printer is operative responsive at least in part to the at least one processor to print documents.

13. The apparatus according to claim 12 wherein the housing includes an opening therein, wherein the opening is accessible from outside the housing, and wherein cash dispensed by the cash dispenser and documents printed by the printer are accessible through the opening.

14. The apparatus according to claim 13 wherein the opening includes a member portion therein, and wherein cash is delivered on a first side of the member portion and printed documents are delivered on an opposed second side of the member portion.

15. The apparatus according to claim 14 wherein the member portion extends generally horizontally and includes a cut out, and wherein dispensed cash and printed documents are enabled to be grasped single handedly in the area of the cut out.

16. The apparatus according to claim 12 and further including a scanning device, wherein the scanning device is in operative connection with the at least one processor and wherein cash is dispensed responsive at least in part to scanning a check with the scanning device.

17. The apparatus according to claim 1
wherein the machine is located at an establishment of a merchant,
wherein the machine is subject to an agreement between the merchant and a discount machine provider,
wherein the machine includes at least one reader,
wherein the at least one reader is operable to read user data usable to identify at least one of an account and a user of the machine,
wherein the at least one reader includes the card reader,
wherein the machine includes at least one input device,
wherein the at least one processor is configured
based at least in part on
the at least one reader reading user data that corresponds to a machine user of a first type, and
the at least one input device receiving a request for a cash withdrawal transaction from the machine user,
to
cause the machine to carry out the cash withdrawal transaction through use of
a particular transaction switch which causes a switch usage fee to be assessed, and
the cash dispenser,
and cause a user transaction fee to be assessed to the machine user for use of the machine to carry out the cash withdrawal transaction, wherein the user transaction fee differs from the switch usage fee, wherein the user transaction fee includes a portion allocated to an account of the merchant, and wherein the user transaction fee includes a portion allocated to an account of the discount machine provider.

18. Apparatus comprising:

an automated banking machine, including:

a card reader, wherein the card reader is operative to read card data from user cards, wherein the card data corresponds to financial accounts;

a lockable housing, wherein the lockable housing bounds an interior area;

a cash dispenser;

at least one processor in operative connection with the card reader and the cash dispenser, and wherein the at least one processor includes a configuration that causes the cash dispenser to dispense cash from the machine responsive to communication of at least one message between the machine and at least one remote system, and wherein the configuration is adapted to prevent reconfiguring of the at least one processor to enable communication of the at least one message between the machine and any remote system other than the at least one remote system.

19. The apparatus according to claim 18 wherein the at least one remote system is associated with a system address.

20. The apparatus according to claim 19 wherein the system address includes a network address of a transaction switch.

21. The apparatus according to claim 18 wherein the configuration includes fixed programming.

22. The apparatus according to claim 18 wherein the machine is located at an establishment of a merchant, wherein the machine is subject to an agreement between the merchant and a discount machine provider, wherein the machine includes at least one reader, wherein the at least one reader is operable to read user data usable to identify at least one of an account and a user of the machine, wherein the at least one reader includes the card reader, wherein the machine includes at least one input device, wherein the at least one processor is configured based at least in part on the at least one reader reading user data that corresponds to a machine user of a first type, and the at least one input device receiving a request for a cash withdrawal transaction from the machine user, to cause the machine to carry out the cash withdrawal transaction through use of a particular transaction switch which causes a switch usage fee to be assessed, and the cash dispenser, and cause a user transaction fee to be assessed to the machine user for use of the machine to carry out the cash withdrawal transaction, wherein the user transaction fee differs from the switch usage fee, wherein the user transaction fee includes a portion allocated to an account of the merchant, and wherein the user transaction fee includes a portion allocated to an account of the discount machine provider.

23. An apparatus including:

an automated banking machine located at an establishment of a merchant, wherein the machine is subject to an agreement between the merchant and a discount machine provider, wherein the machine includes at least one reader, wherein the at least one reader is operable to read user data usable to identify at least one of an account and a user of the machine, wherein the machine includes a cash dispenser, wherein the machine includes at least one input device, wherein the machine includes at least one processor, wherein the at least one processor is configured based at least in part on the at least one reader reading user data that corresponds to a machine user of a first type, and the at least one input device receiving a request for a cash withdrawal transaction from the machine user, to cause the machine to carry out the cash withdrawal transaction through use of a particular transaction switch which causes a switch usage fee to be assessed, and the cash dispenser, and cause a user transaction fee to be assessed to the machine user for use of the machine to carry out the cash withdrawal transaction, wherein the user transaction fee differs from the switch usage fee, wherein the user transaction fee includes a portion allocated to an account of the merchant, and wherein the user transaction fee includes a portion allocated to an account of the discount machine provider, wherein the at least one processor is programmed to cause responsive to communication of at least one message between the machine and at least one remote system, the cash dispenser to dispense cash in carrying out the cash withdrawal transaction, wherein the at least one processor includes a configuration adapted to prevent reconfiguring of the at least one processor, wherein the configuration secures the at least one processor from programming tampering which would enable communication of the at least one message between the machine and any remote system other than the at least one remote system.

24. The apparatus according to claim 23 wherein the at least one processor includes programming, wherein the configuration prevents changing of the programming to enable communication of the at least one message between the machine and any remote system other than the at least one remote system.

25. The apparatus according to claim 24 wherein the at least one remote system is associated with a system address.

26. The apparatus according to claim 25 wherein the system address includes an address of the particular transaction switch.

27. The apparatus according to claim 26 wherein the system address includes a network address.

28. The apparatus according to claim 24 wherein the configuration includes fixed programming.

29. The apparatus according to claim 23 wherein the at least one processor includes programming, wherein the machine includes a lockable housing, wherein the lockable housing bounds an interior area, wherein the at least one processor is in operative connection with the at least one reader and the cash dispenser, wherein the configuration prevents changing of the programming to enable communication of the at least one message between the machine and any remote system other than the at least one remote system.

30. The apparatus according to claim 23 wherein the machine includes at least one item acceptor, wherein the at least one item acceptor is operable to accept at least one of cash and checks from users of the machine.

* * * * *